US012057055B2

(12) United States Patent
Lee et al.

(10) Patent No.: US 12,057,055 B2
(45) Date of Patent: Aug. 6, 2024

(54) DISPLAY DRIVING CIRCUIT, A HOST, A DISPLAY SYSTEM INCLUDING THE DISPLAY DRIVING CIRCUIT AND THE HOST, AND AN OPERATION METHOD OF THE DISPLAY SYSTEM

(71) Applicant: SAMSUNG ELECTRONICS CO., LTD., Suwon-si (KR)

(72) Inventors: Changju Lee, Suwon-si (KR); Sooyong Kim, Suwon-si (KR); Taesung Kim, Suwon-si (KR); Junho Huh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/209,540

(22) Filed: Jun. 14, 2023

(65) Prior Publication Data

US 2024/0029624 A1 Jan. 25, 2024

(30) Foreign Application Priority Data

Jul. 21, 2022 (KR) ........................ 10-2022-0090617

(51) Int. Cl.
*G09G 5/18* (2006.01)
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0842* (2013.01); *G09G 2300/0861* (2013.01); *G09G 2310/08* (2013.01); *G09G 2320/0247* (2013.01); *G09G 2330/023* (2013.01); *G09G 2370/00* (2013.01)

(58) Field of Classification Search
CPC ............... G09G 3/2096; G09G 3/3233; G09G 2300/0842; G09G 2300/0861; G09G 2310/08; G09G 2320/0247; G09G 2330/023; G09G 2370/00
USPC .......................................................... 345/213
See application file for complete search history.

(56) References Cited

U.S. PATENT DOCUMENTS

| | | | | |
|---|---|---|---|---|
| 9,318,072 | B2 | 4/2016 | Cha et al. | |
| 9,472,133 | B2 | 10/2016 | Kim et al. | |
| 9,495,926 | B2 | 11/2016 | Tripathi et al. | |
| 10,008,182 | B2 | 6/2018 | Lee et al. | |
| 10,019,968 | B2 | 7/2018 | Bi et al. | |
| 10,096,303 | B2 | 10/2018 | Lee et al. | |
| 2015/0279334 | A1* | 10/2015 | Kwa .................... | G09G 3/2096 345/213 |

(Continued)

*Primary Examiner* — Abdul-Samad A Adediran
(74) *Attorney, Agent, or Firm* — F. Chau & Associates, LLC

(57) ABSTRACT

A display driving circuit for receiving image data from a host and driving a display panel, the display driving circuit including: an interface configured to receive the image data from the host; and a timing controller configured to control a first interrupt signal for waking up the host in a low-power mode and to control a second interrupt signal based on a light emission control signal, wherein the light emission control signal is for controlling a light emission time of a pixel included in the display panel, and wherein the timing controller is further configured to control a level of the second interrupt signal based on whether the image data has started to be received from the host in response to the first interrupt signal and the second interrupt signal.

19 Claims, 14 Drawing Sheets

(56) References Cited

U.S. PATENT DOCUMENTS

2021/0350752 A1 11/2021 Ge et al.

* cited by examiner

DISPLAY DRIVING CIRCUIT, A HOST, A DISPLAY SYSTEM INCLUDING THE DISPLAY DRIVING CIRCUIT AND THE HOST, AND AN OPERATION METHOD OF THE DISPLAY SYSTEM

CROSS-REFERENCE TO RELATED APPLICATION

This application claims priority under 35 § 119 to Korean Patent Application No. 10-2022-0090617, filed on Jul. 21, 2022, in the Korean Intellectual Property Office, the disclosure of which is incorporated by reference herein in its entirety.

TECHNICAL FIELD

The inventive concept relates to a display driving circuit and a display system including the same, and more particularly, to a display driving circuit for driving a display panel to display an image on the display panel, and an operation method of the display driving circuit.

DISCUSSION OF RELATED ART

A display device is an output device for presentation of information in visual form. The display device includes a display panel for displaying an image, and a display driving circuit for driving the display panel. The display driving circuit may receive image data from a host and apply, to data lines of the display panel, image signals corresponding to the received image data, to drive the display panel. The display device may be implemented as a liquid crystal display (LCD), a light-emitting diode (LED) display, an organic LED (OLED) display, an active-matrix OLED (AMOLED) display, or a flexible display.

The display panel may be produced through a low-temperature polycrystalline oxide (LTPO) process. A pixel circuit of an LTPO display panel is able to retain image data for a long time without loss due to charge leakage. Accordingly, the display panel may be driven at a low frame rate. Because the display panel may be driven at a low frame rate, the display device may operate in a video mode. In the video mode, image data received from the host may be displayed on the display panel without being stored in a memory. However, when in the video mode, it is necessary to control a time point at which the host transmits the image data to the display driving circuit, and a time point at which the display driving circuit drives the display panel to display the image data.

In addition, as the display panel is driven at a low frame rate, the host may operate in a low-power mode, in which case, an interface for synchronizing timings between the host and the display driving circuit may not operate. In other words, the timings between the host and the display driving circuit may be asynchronous with each other. When a time point at which the host transmits image data to the display driving circuit and a time point at which the display driving circuit drives the display panel to display the image data are asynchronous with each other, flicker may occur. To prevent this from happening, a technique for synchronizing timings between a host and a display driving circuit when transmitting image data to a display device when the host is operating in a low-power mode may be employed.

SUMMARY

The inventive concept provides a display driving circuit capable of transmitting an interrupt signal to a host based on a time period during which an image signal is able to be provided to a display panel, and receiving image data that is transmitted from the host in response to the interrupt signal, and an operation method of the display driving circuit.

According to an embodiment of the inventive concept, there is provided a display driving circuit for receiving image data from a host and driving a display panel, the display driving circuit including: an interface configured to receive the image data from the host; and a timing controller configured to control a first interrupt signal for waking up the host in a low-power mode and to control a second interrupt signal based on a light emission control signal, wherein the light emission control signal is for controlling a light emission time of a pixel included in the display panel, wherein the timing controller is further configured to control a level of the second interrupt signal based on whether the image data has started to be received from the host in response to the first interrupt signal and the second interrupt signal.

According to an embodiment of the inventive concept, there is provided a display driving circuit for operating in a video mode, the display driving circuit including: an interface configured to receive image data from a host; and a timing controller configured to determine a time period during which an image signal corresponding to the image data received from the interface in the video mode is to be provided to a display panel, wherein the timing controller is further configured to generate a first interrupt signal for waking up the host in a low-power mode; control a second interrupt signal based on the time period during which the image signal is to be provided to the display panel, and control a level of the second interrupt signal based on whether the image data has started to be received from the host in response to the first interrupt signal and the second interrupt signal through the interface.

According to an embodiment of the inventive concept, there is provided an operation method of a display driving circuit for receiving image data from a host and driving a display panel, the operation method including: generating a first interrupt signal for waking up the host in a low-power mode; determining a time period during which the display driving circuit is to provide the display panel with an image signal corresponding to the image data; controlling, based on the time period during which the image signal is to be provided to the display panel, a level of a second interrupt signal; and controlling the level of the second interrupt signal, based on whether the image data has started to be received from the host that has woken up and the host has responded to the second interrupt signal.

According to an embodiment of the inventive concept, there is provided a host including: an interface configured to transmit image data to a display driving circuit; and a display processor configured to generate the image data, wherein the display processor is further configured to wake up from a low-power mode, in response to a first interrupt signal received from the display driving circuit, and determine whether to transmit the image data to the display driving circuit through the interface, in response to a level of a second interrupt signal received from the display driving circuit, or a change in the level of the second interrupt signal.

According to an embodiment of the inventive concept, there is provided a display system including: a low-temperature polycrystalline oxide (LIPO) display panel; a display driving circuit configured to transmit, to a host, a first interrupt signal for waking up the host in a low-power mode, and a second interrupt signal to be controlled based on a time period during which an image signal corresponding to image data is to be provided to the LTPO display panel; and the host configured to wake up in response to the first interrupt signal and determine, in response to the second interrupt signal, whether to transmit the image data to the display driving circuit, wherein the display driving circuit is further configured to control a level of the second interrupt signal based on whether the image data has started to be received from the host.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept will be described in detail with reference to the accompanying drawings.

Figure 1:
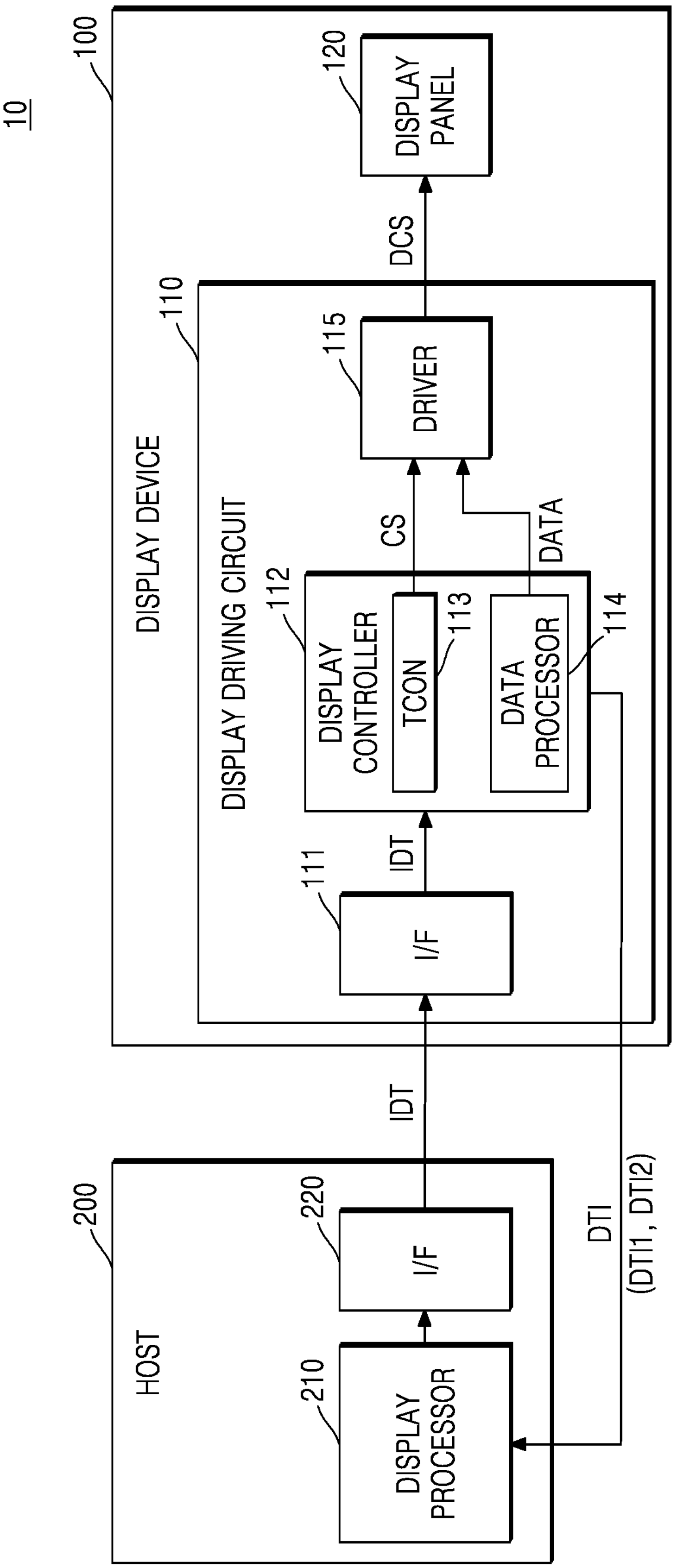
FIG. 1 is a block diagram illustrating a display system according to an embodiment of the inventive concept.

FIG. 1 is a block diagram illustrating a display system 10 according to an embodiment of the inventive concept.

The display system 10 may be mounted on electronic devices having an image display function. For example, the electronic devices may include smart phones, tablet personal computers (PCs), portable multimedia players (PMPs), cameras, wearable devices, internet-of-things devices, televisions (TVs), digital video disk (DVD) players, refrigerators, air conditioners, air purifiers, set-top boxes, robots, drones, various medical devices, navigation devices, global positioning system (GPS) receivers, advanced driver-assistance systems (ADASs), vehicle devices, furniture, various measuring instruments, etc.

Referring to FIG. 1, the display system 10 may include a host 200, a display driving circuit (also referred to as a display driving integrated circuit) 110, and a display panel 120. In an embodiment, the display driving circuit 110 and the display panel 120 may be implemented as one module, which may be referred to as a display device 100. For example, the display driving circuit 110 may be mounted on a circuit film, such as a tape carrier package (TCP), a chip on film (COF), or a flexible printed circuit (FPC), and then attached to the display panel 120 by tape automatic bonding (TAB), or may be mounted in a non-display area of the display panel 120 by a chip-on-glass (COG) or chip-on-plastic (COP) method.

The host 200 may control the overall operation of the display system 10. The host 200 may generate image data DT to be displayed on the display panel 120, and transmit the image data IDT to the display driving circuit 110.

The host 200 may be an application processor. However, the inventive concept is not limited thereto, and the host 200 may be implemented as various types of processors, such as a central processing unit (CPU), a microprocessor, a multimedia processor, or a graphics processor. In an embodiment, the host 200 may be implemented as an integrated circuit (IC), and may be implemented as a mobile application processor (AP) or a system on chip (SoC).

The host 200 may include a display processor 210 and an interface (I/F) 220. The display processor 210 may control an operation of the display device 100. The display processor 210 may transmit, to the display device 100 through the interface 220, the image data IDT to be displayed on the display device 100.

The display processor 210 may generate the image data IDT to be displayed on the display panel 120, and transmit the image data IDT to the display driving circuit 110. In an embodiment, the display processor 210 may transmit a control command to the display driving circuit 110. For example, the control command may include setting information about luminance, gamma, a frame frequency, an operating mode of the display driving circuit 110, and the like. The display processor 210 may transmit a clock signal, a synchronization signal, or the like to the display driving circuit 110. For example, the display processor 210 may transmit, through communication with the display driving circuit 110, a synchronization signal for synchronizing an internal clock signal of the display driving circuit 110 with a clock signal generated by the host 200.

The host 200 may transmit the image data IDT to the display driving circuit 110. The host 200 may provide the image data IDT to the display device 100 through a high-speed serial interface (HSSI). For example, the host 200 may provide the image data IDT to the display device 100 according to the mobile industry processor interface (MIPI) standard, but this is only an example and the inventive concept is not limited thereto.

The display driving circuit 110 may convert the image data IDT received from the host 200 into image signals for driving the display panel 120, and then supply the image signals to the display panel 120 to display an image on the display panel 120.

The display driving circuit 110 may operate in a video mode in which the image data IDT is received from the host 200. The display device 100 may display a moving image and a still image in the video mode. In the video mode, the display driving circuit 110 may control the image data IDT received from the host 200 to be displayed on the display panel 120 without being stored in an internal memory of the display driving circuit 110. In other words, the image data IDT is not stored in an internal memory of the display driving circuit 110 during the video mode.

The display driving circuit 110 may include an interface 111, a display controller 112, and a driver 115. The display driving circuit 110 may receive the image data IDT from the host 200 through the interface 111. In an embodiment, the interface 220 of the host 200 and the interface 111 of the display driving circuit 110 may be MIPIs. In the video mode, the image data IDT received through the interface 111 may be transmitted to the display controller 112.

The display controller 112 may control the overall operation of the display driving circuit 110. The display controller 112 may include a timing controller (TCON) 113 and a data processor 114. The timing controller 113 may receive the image data IDT. For example, the image data IDT may be in the form of a stream and may include timing information. The timing controller 113 may generate, based on the timing information, control signals CS for controlling the driver 115. The driver 115 may provide voltages to gate lines and data lines of the display panel 120 in response to the control signals CS. Operations of the timing controller 113 and the driver 115 are described below in detail with reference to FIGS. 2 and 3.

The data processor 114 may receive the image data IDT. The data processor 114 may convert the image data IDT into data DATA and transmit the data DATA to the driver 115. The data processor 114 may convert the image data IDT excluding the timing information and thus output the data DATA. The data processor 114 may be omitted.

The timing controller 113 may determine a time period (hereinafter, referred to as a data provision time period) during which the display driving circuit 110 is able to provide the display panel 120 with image signals corresponding to the image data IDT. The data provision time period may refer to a state in which the display panel 120 is able to update an image signal. In the video mode, the image data IDT is not stored in the memory, and thus, it is necessary to control a time point at which the image data IDT is received from the host 200, and a time point at which the display driving circuit 110 generates the image signals. For example, the display driving circuit 110 may generate an image signal regarding a previous frame, provide the image signal to the display panel 120, and then receive image data regarding a next frame. When the display driving circuit 110 and the host 200 are not synchronized with each other, the display driving circuit 110 may receive the image data IDT from the host 200 when the display driving circuit 110 is unable to provide the display panel 120 with the image signals corresponding to the image data IDT. In other words, the display driving circuit 110 may receive the image data IDT in a time period other than the data provision time period. When the display driving circuit 110 receives the image data IDT from the host 200 in a period other than the data provision time period, a reduction in image quality, such as flicker, may occur.

The timing controller 113 may determine the data provision time period based on a control signal for driving the display panel 120. In an embodiment, the timing controller 113 may determine the data provision time period based on a light emission control signal applied to the display panel 120 for controlling a light emission time of a pixel.

The timing controller 113 may generate an interrupt signal DTI. DTI may be referred to as 'display timing interrupt'. The interrupt signal DTI may include a first interrupt signal DTI1 and a second interrupt signal DTI2. The first interrupt signal DTI1 may be a signal for waking up the host 200. For example, the first interrupt signal DTI1 may wake up the host 200 in a low-power mode. The timing controller 113 may control the level of the first interrupt signal DTI1. The timing controller 113 may control the first interrupt signal DTI1 to be at an active level to wake up the host 200. For example, the timing controller 113 may control the first interrupt signal DTI1 at a logic low level (e.g., inactive level) to be at a logic high level (e.g., active level).

The second interrupt signal DTI2 may be an interrupt signal generated after the first interrupt signal DTI1 is generated. The second interrupt signal DTI2 is an interrupt signal after the level of the first interrupt signal DTI1 is changed from an inactive level to an active level, and may inform the host 200 of the timing of transmitting the image data IDT regarding the next frame. In other words, the second interrupt signal DTI2 may inform the host 200 when the image data IDT of the next frame is to be transmitted to the display device 100. In an embodiment, the display driving circuit 110 may operate in the video mode or a command mode. A pin that provides the interrupt signal DTI in the video mode may also be used as a pin that provides a tearing effect signal in the command mode.

The timing controller 113 may control the level of the second interrupt signal DTI2 based on the data provision time period. The timing controller 113 may control the second interrupt signal DTI2 such that the display device 100 can receive data from the host 200 during the data provision time period. The level of the second interrupt signal DTI2 may be an active level or an inactive level. For example, when the level of the second interrupt signal DTI2 is the active level, the second interrupt signal DTI2 may be at a logic high level, and when the level of the second interrupt signal DTI2 is the inactive level, the second interrupt signal DTI2 may be at a logic low level. However, the inventive concept is not limited thereto, and when the level of the second, interrupt signal DTI2 is the active level, the second interrupt signal DTI2 may be at a logic low level, and when the level of the second interrupt signal DTI2 is the inactive level, the second interrupt signal DTI2 may be at a logic high level.

The timing controller 113 may control the second interrupt signal DTI2 to be at the active level based on the data provision time period. The timing controller 113 may control the second interrupt signal DTI2 to be at the active level such that reception of the image data IDT starts in the data provision time period. The timing controller 113 may control the second interrupt signal DTI2 to be at the active level in at least a part of the data provision time period. The timing controller 113 may also control the second interrupt signal DTI2 to be at the active level in a part of a period other than the data provision time period such that reception of the image data IDT starts in the data provision time period.

In an embodiment, the timing controller 113 may control the second interrupt signal DTI2 to be at the active level in the data provision time period, and to be at the inactive level in a period other than the data provision time period. For example, the timing controller 113 may control the second interrupt signal DTI2 to be at the logic high level in the data provision time period, and to be at the logic low level in a period other than the data provision time period.

The timing controller 113 may control the second interrupt signal DTI2 to be at the active level in a part of the data provision time period, and may control the second interrupt signal DTI2 to be at the active level before a preset time period from the start of the data provision time period. However, the inventive concept is not limited thereto.

The timing controller 113 may control the level of an interrupt signal based on a light emission control signal. The timing controller 113 may control the second interrupt signal DTI2 to be at the active level based on a time point at which the level of the light emission control signal changes. In other words, the second interrupt signal DTI2 may be at the active level in response to a transition in the level of the light emission control signal. For example, the timing controller 113 may control the second interrupt signal DTI2 to be at the active level based on a time point at which the level of the light emission control signal changes from an inactive level to an active level. In addition, the timing controller 113 may control the second interrupt signal DTI2 to be at the active level before a preset time period prior to the time point at which the level of the light emission control signal changes from the inactive level to the active level. The timing controller 113 may maintain the active level for a preset time period.

In an embodiment, the timing controller 113 may control the second interrupt signal DTI2 to be at the active level based on a period in which the light emission control signal is at the inactive level. For example, based on a period in which the light emission control signal is at the inactive level, the timing controller 113 may control the second interrupt signal DTI2 to be at the logic high level, which is an active level. In other words, when the light emission control signal is at the logic low level, the second interrupt signal DTI2 is at the logic high level.

The timing controller 113 may transmit the first interrupt signal DTI1 and the second interrupt signal DTI2 to the host 200. The display processor 210 may receive the first interrupt signal DTI1 and then wake up from the low-power mode. The display processor 210 may prepare to transmit the image data IDT in response to the first interrupt signal DTI1 at the active level. When the display processor 210 completes the preparation for transmission of the image data IDT, the display processor 210 may transmit the image data IDT to the display driving circuit 110 based on the second interrupt signal DTI2.

Based on at least one of the level of the second interrupt signal DTI2 and a change in the level of the second interrupt signal DTI2, the host 200 may determine whether to transmit the image data IDT to the display driving circuit 110. In an embodiment, the display processor 210 may determine whether to transmit the image data IDT to the display driving circuit 110 in synchronization with a time point at which the level of the second interrupt signal DTI2 changes. For example, when the display processor 210 completes the preparation for transmission of the image data IDT, the transmission of the image data IDT may start in synchronization with the time point at which the level of the second interrupt signal DTI2 changes from the inactive level to the active level. The display processor 210 may start the transmission of the image data IDT at a rising edge of the second interrupt signal DTI2. However, the inventive concept is not limited thereto.

In an embodiment, the host 200 may transmit the image data IDT when the second interrupt signal DTI2 is at the active level. The display processor 210 may start the transmission of the image data IDT when the second interrupt signal DTI2 is at the active level and the preparation for transmission of the image data IDT is completed. When the display processor 210 has completed the preparation for transmission of the image data IDT but the second interrupt signal DTI2 is at the inactive level at a time point of transmitting the image data IDT, the image data IDT cannot be transmitted to the display driving circuit 110. When the preparation for transmission of the image data IDT has been completed and the second interrupt signal DTI2 is at the inactive level, the display processor 210 may wait for the level of the second interrupt signal DTI2 to be the active level. When the level of the second interrupt signal DTI2 is the active level, the display processor 210 may then transmit the image data IDT to the display driving circuit 110.

The timing controller 113 may control the level of the second interrupt signal DTI2 based on whether the image data IDT has started to be received from the host 200. Based on a time point at which the level of the second interrupt signal DTI2 changes, the timing controller 113 may determine whether the image data IDT has started to be received.

In an embodiment, based on a time point at which the level of the second interrupt signal DTI2 changes from the inactive level to the active level, the timing controller 113 may determine whether the image data IDT has started to be received. The timing controller 113 may determine whether the image data IDT has started to be received within a certain time period from the time point at which the level of the second interrupt signal DTI2 changes. For example, the timing controller 113 may determine whether the image data IDT has started to be received within a time period from a time point at which the level of the second interrupt signal DTI2 changes from the logic low level to the logic high level. The time period from the time point at which the level of the second interrupt signal DTI2 changes may be within the data provision time period. The display driving circuit 110 may receive the image data IDT in the data provision time period and thus generate image signals. The second interrupt signal DTI2 may be controlled based on the data provision time period.

Accordingly, the image data IDT is transmitted from the host 200 to the display driving circuit 110 in the data provision time period, thus the timing between the host 200 and the display driving circuit 110 may be synchronized, and accordingly, flicker may be prevented.

The display panel 120 is a display unit for displaying an image, and may be a display device capable of receiving electrically transmitted image signals and displaying a two-dimensional image, such as a thin-film-transistor liquid-crystal display (TFT-LCD), an organic light-emitting diode (OLED) display, a field-emission display, or a plasma display panel (PDP). The display panel 120 may be implemented as a flat-panel display or a flexible display panel.

Figure 2:
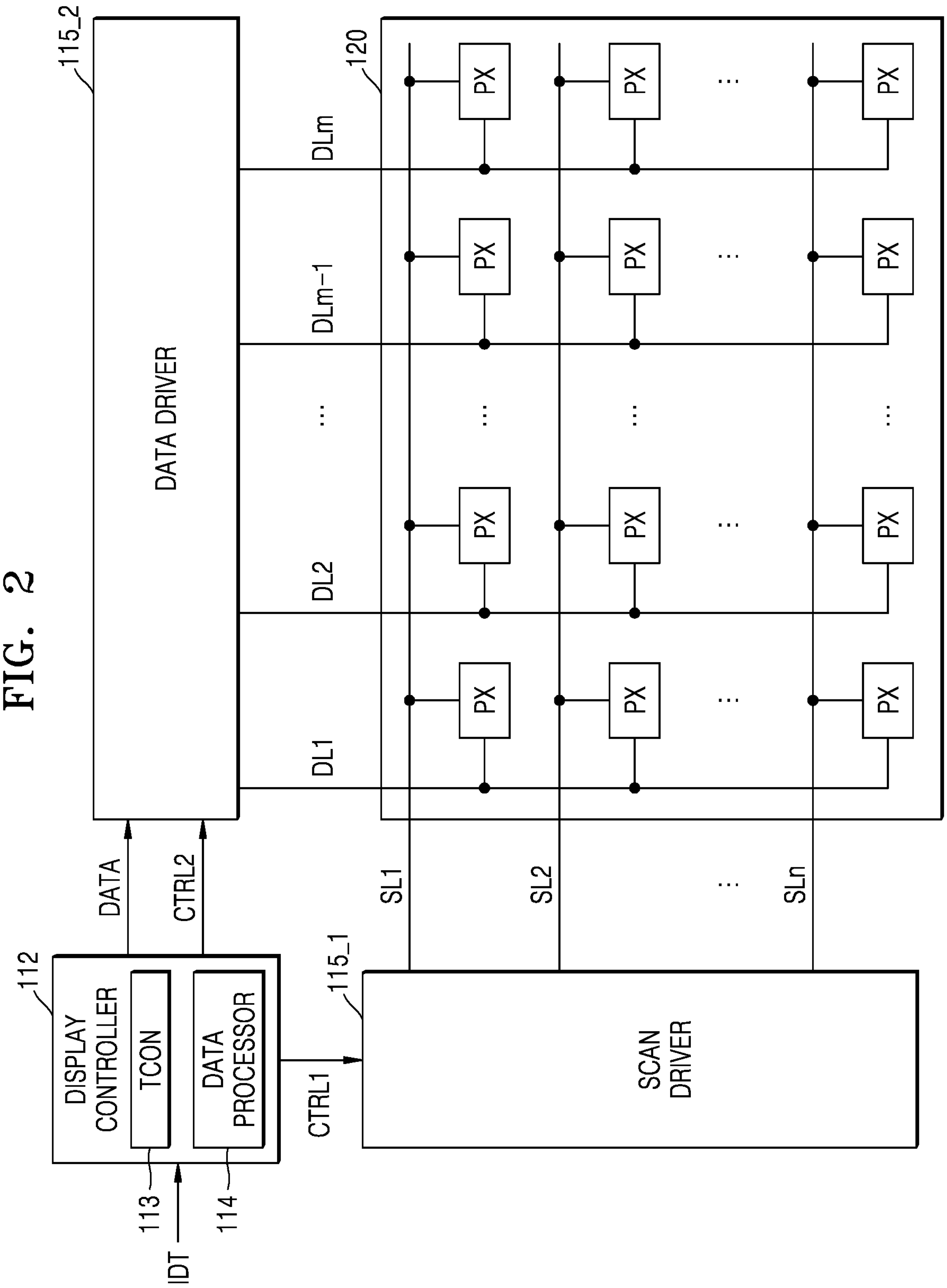
FIG. 2 is a block diagram illustrating a partial configuration of a display device according to an embodiment of the inventive concept.

FIG. 2 is a block diagram illustrating a partial configuration of a display device according to an embodiment of the inventive concept. The display controller 112, the timing controller 113, the data processor 114, drivers 115_1 and 115_2, and the display panel 120 of FIG. 2 correspond to the display controller 112, the timing controller 113, the data processor 114, the driver 115, and the display panel 120 of FIG. 1, respectively, and thus, redundant descriptions thereof may be omitted.

Referring to FIGS. 1 and 2, the drivers 115_1 and 115_2 may include the scan driver 115_1 and the data driver 115_2. However, the display driving circuit 110 may not include the scan driver 115_1, and the scan driver 115_1 may be included in the display device 100 as a component separate from the display driving circuit 110.

The display panel 120 includes a plurality of pixels PX arranged in a matrix form, and may display an image in units of frames. The display panel 120 may include scan lines SL1 to SLn arranged in the row direction, data lines DL1 to DLm arranged in the column direction, and the pixels PX formed at intersections of the scan lines SL1 to SLn and the data lines DL1 to DLm.

The scan driver 115_1 may sequentially select the pixels PX by sequentially applying scan signals to the pixels PX in units of lines. In response to a scan control signal CTRL1 provided from the timing controller 113, the scan driver 115_1 may sequentially select the scan lines SL1 to SLn by sequentially supplying scan-on signals to the scan lines SL1 to SLn. According to the scan-on signals output from the scan driver 115_1, the scan lines SL1 to SLn may be sequentially selected, grayscale voltages corresponding to the pixels PX connected to the selected scan lines may be applied to the pixels PX through the data lines DL1 to DLm, and thus, a display operation may be performed. In a period in which no scan-on signal is supplied to the scan lines SL1 to SLn, scan-off signals (e.g., scan voltages at a logic high level) may be supplied to the scan lines SL1 to SLn.

In response to a data control signal CTRL2, the data driver 115_2 may convert the data DATA corresponding to the image data IDT into image signals that are analog signals, and provide the image signals to the data lines DL1 to DLm. The data driver 115_2 may include a plurality of channel amplifiers, each of which may provide image signals to at least one data line corresponding thereto.

The timing controller 113 may control the overall operation of the display panel 120. The timing controller 113 may be implemented as hardware, software, or a combination thereof, and, for example, may be implemented as digital logic circuits and registers that perform various functions as described below.

The timing controller 113 may receive the image data IDT and generate control signals (e.g., the scan control signal CTRL1 and the data control signal CTRL2) for controlling the data driver 115_2 and the scan driver 115_1 such that the image data IDT is displayed on the display panel 120.

The data processor 114 may convert the image data IDT received from outside the display driving circuit 110 to have a format that conforms to the interface specification with the data driver 115_2, and transmit the converted data DATA to the data driver 115_2.

Figure 3:
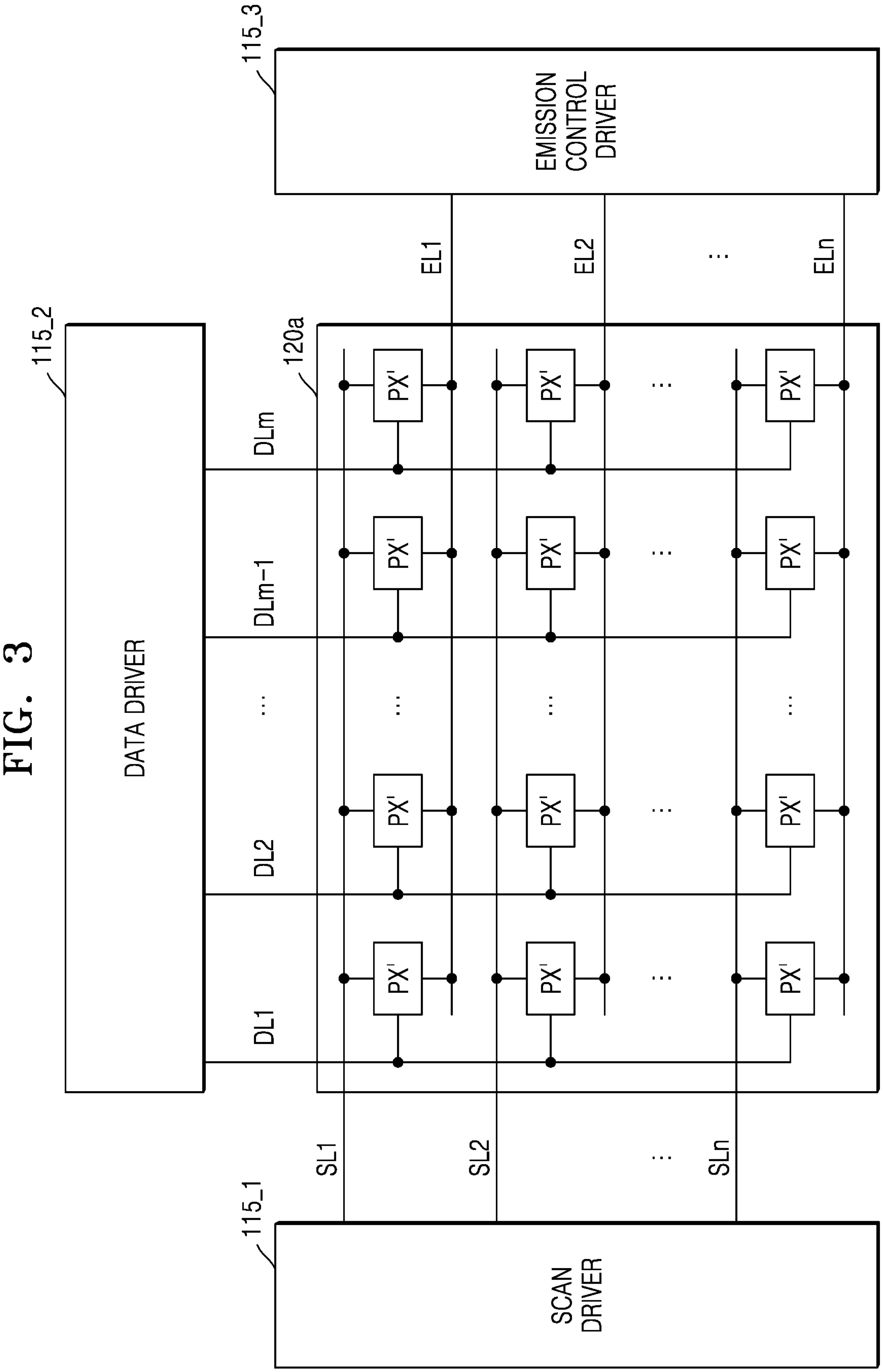
FIG. 3 is a block diagram for describing a display panel according to an embodiment of the inventive concept.

FIG. 3 is a block diagram for describing a display panel according to an embodiment of the inventive concept. The driver 115 and the display panel 120 of FIG. 1 may correspond to drivers 115_1, 115_2, and 115_3, and a display panel 120*a* of FIG. 3, respectively. FIG. 3 illustrates an OLED panel as an example of the display panel 120 of FIG. 1, and redundant descriptions of the same reference numerals as in FIG. 2 may be omitted.

Referring to FIG. 3, the display panel 120*a* may include the plurality of data lines DL1 to DLm, the plurality of scan lines SL1 to SLn, a plurality of light emission control lines EL1 to ELn, and a plurality of pixels PX' between the data lines DL1 to DLm, scan lines SL1 to SLn and light emission control lines EL1 to ELn. The plurality of pixels PX' may be connected to their corresponding scan lines, data lines, and light emission control lines, respectively.

A light emission control driver 115_3 may be connected to the plurality of light emission control lines EL1 to ELn, and may sequentially apply a light emission control signal to the pixels PX' to control light emission times of the pixels PX'. Each of the pixels PX' may include an OLED corresponding thereto, and may include a transistor that supplies a driving current corresponding to an image signal to the OLED or blocks the driving current being supplied to the OLED. The light emission control signal provided through each of the plurality of light emission control lines EL1 to ELn may turn on/off the transistor providing the driving current to the OLED, to control a light emission time of the OLED.

The luminance value of each of the pixels PX' may vary depending on the duty ratio of the light emission control signal. As the duty ratio of the light emission control signal (e.g., the length of an on period of the light emission control signal with respect to the period of the light emission control signal) increases, the time period during which the pixels PX' emit light may increase, and thus, the luminance of the pixels PX' may increase. As such, under control by a timing controller (e.g., the timing controller 113 of FIG. 2), the light emission control driver 115_3 may adjust the luminance of the display panel 120*a* by adjusting pulse-width modulation (PWM) of the light emission control signal.

Figure 4:
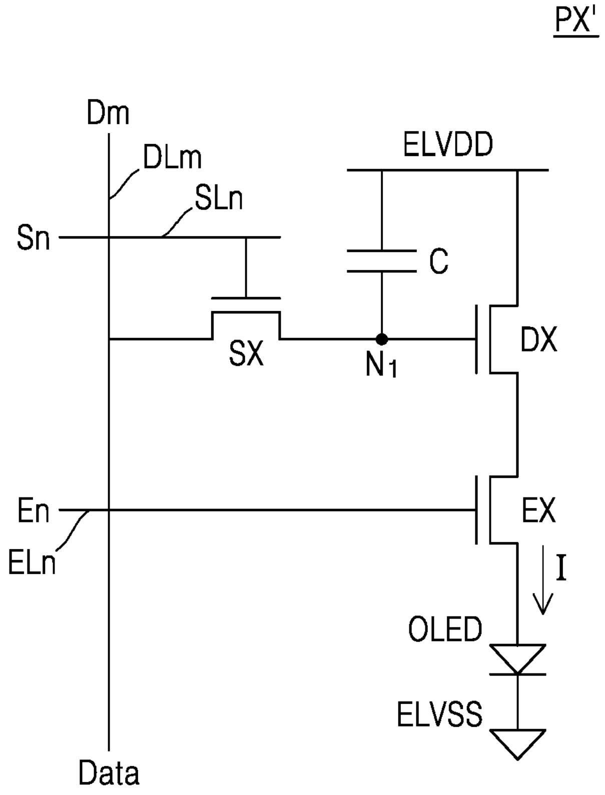
FIG. 4 is a circuit diagram illustrating a pixel according to an embodiment of the inventive concept.
Figure 5A:
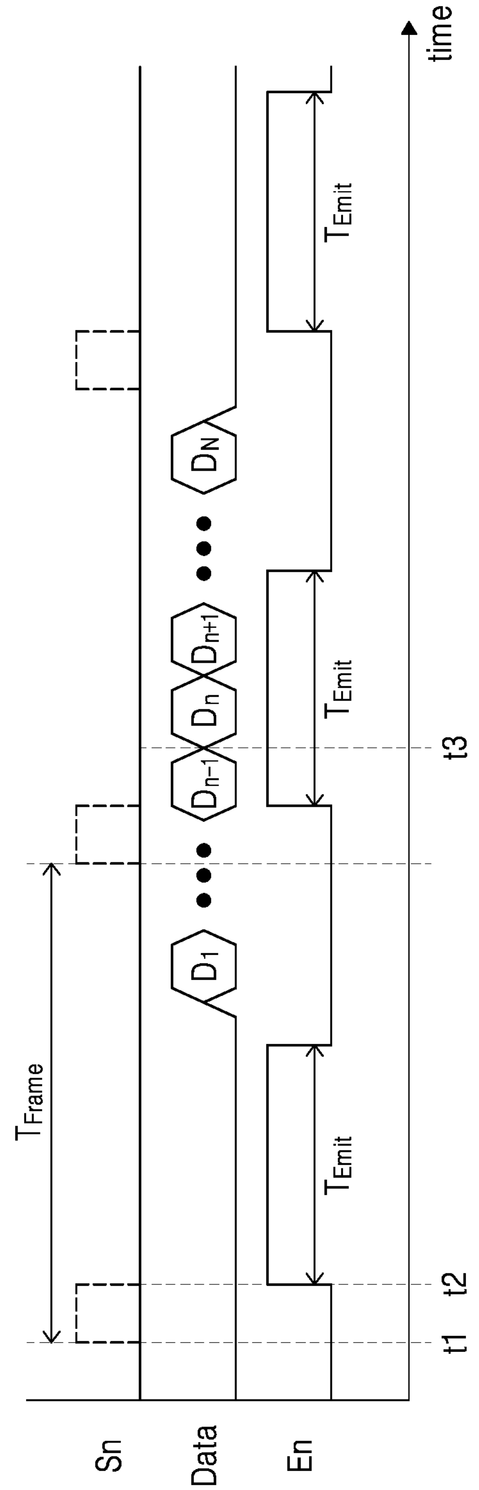
FIG. 5A is a timing diagram for driving the pixel of FIG. 4, according to an embodiment of the inventive concept.
Figure 5B:
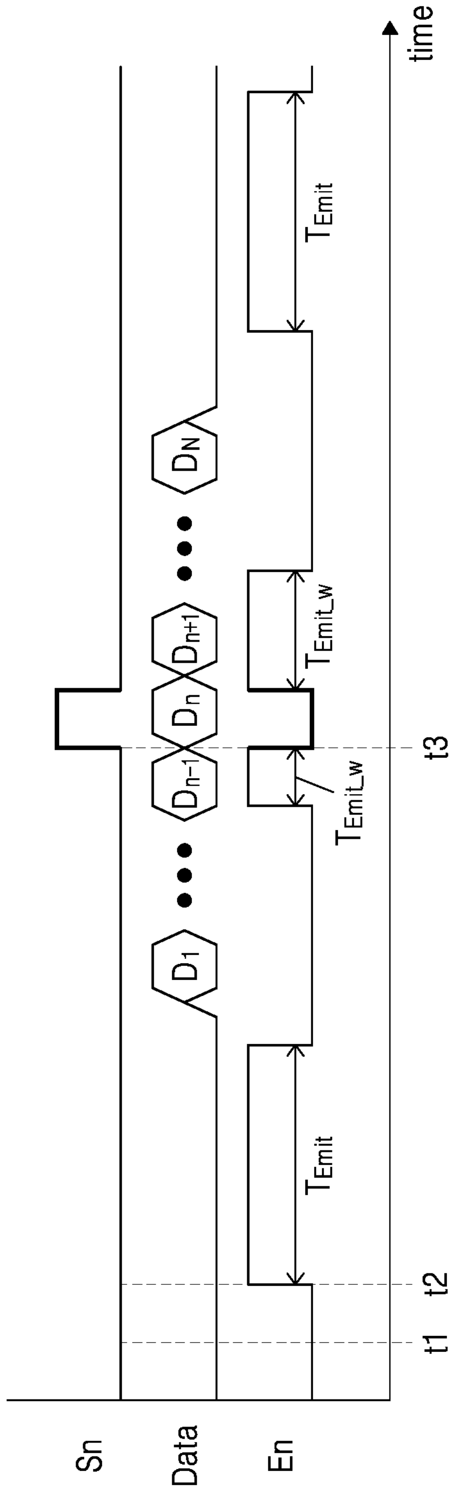
FIG. 5B is a diagram for describing a case in which communication between a host and a display driving circuit is not seamless.

FIG. 4 is a circuit diagram illustrating the pixel PX' according to an embodiment of the inventive concept, and FIGS. 5A and 5B are timing diagrams for driving the pixel PX' of FIG. 4, according to an embodiment of the inventive concept. The pixel PX' of FIG. 4 may be the pixel PX' of FIG. 3. Hereinafter, descriptions are given with reference to FIGS. 3, 4, 5A, and 5B together.

Referring to FIG. 4, the pixel PX' may include a switching transistor SX, a driving transistor DX, a light emission control transistor EX, a capacitor C, and an OLED OLED. Although three transistors and one capacitor are illustrated in FIG. 4, the inventive concept is not limited thereto. The numbers of transistors and capacitors of the pixel PX' may vary.

A first electrode of the switching transistor SX may be connected to the data line DLm, a gate terminal of the switching transistor SX may be connected to the scan line SLn, and a second electrode of the switching transistor SX may be connected to a first node N1. The switching transistor SX may be turned on in response to a scan signal Sn transmitted through the scan line SLn, and then transmit, to the first node N1, an image signal Dm received through the data line DLm.

The capacitor C may be connected between the first node N1 and a first power voltage ELVDD. The capacitor C may store, for a certain period, a voltage corresponding to a voltage difference between the voltage of the first node N1 and the first power voltage ELVDD. When the driving transistor DX is turned on, the OLED OLED may emit light with a driving current corresponding to a voltage written in the first node N1 by the capacitor C.

A first electrode of the driving transistor DX may be connected to the light emission control transistor EX, a gate terminal of the driving transistor DX may be connected to the first node N1, and a second terminal of the driving transistor DX may be connected to the first power voltage ELVDD. As the gate electrode (e.g., gate terminal) of the driving transistor DX is connected to the first node N1 and a voltage applied to the first node N1 is maintained by the capacitor C, the driving transistor DX may be turned on.

In order to control a time point at which an image is displayed by light emission of the OLED OLED and a time period during which the image is displayed by the light emission of the OLED OLED, the pixel PX' may include the light emission control transistor EX connected between the first electrode of the driving transistor DX and an anode electrode of the OLED OLED. For example, the light emission control transistor EX includes a gate electrode connected to the n-th light emission control line ELn, a second electrode connected to the first electrode of the driving transistor DX, and a first electrode connected to the anode electrode of the OLED OLED.

During a period in which the light emission control transistor EX is turned on in response to the n-th light emission control signal En transmitted through the nth light emission control line ELn, a driving current path may be formed between the driving transistor DX and the OLED OLED, thus the driving current I flows therethrough, and the OLED OLED may display an image corresponding to the image signal Dm.

FIG. 5A is a timing diagram for driving the pixel PX' of FIG. 4, according to an embodiment of the inventive concept. Referring to FIG. 5A, when the image signal Dm is input to the switching transistor SX, the light emission control signal En may be at an inactive level. When the light emission control transistor EX is in a turn-on state when the image signal Dm is input to the switching transistor SX, a current may flow into the OLED OLED, and thus, image quality may be affected. Accordingly, when the switching transistor SX is in a turn-on state, the light emission control transistor EX may be in a turn-off state. When the scan signal Sn is at an active level, the light emission control signal En may be at an inactive level. In an embodiment, when the scan signal Sn is at the active level that is a logic high level, the light emission control signal En may be at the inactive level that is a logic low level.

A light emission period of the pixel PX' may be controlled based on the light emission control signal En. A light emission period $T_{Emit}$ refers to a state in which the light emission control signal En is at the active level and the pixel PX' emits light according to the image signal Dm, whereas a non-light-emission period refers to a state in which the light emission control signal En is at the inactive level, light emission of the pixel PX' is disabled, and a data voltage according to the image signal Dm is charged in the capacitor C. At least a part of the non-light-emission period may be a data provision time period. In an embodiment, a period during which the light emission control signal En is at the logic high level, which is the active level, may be the light emission period $T_{Emit}$. A period during which the light emission control signal En is at the logic low level that is the inactive level may be the non-light-emission period. However, the inventive concept is not limited thereto, and a period during which the light emission control signal En is at the logic low level may be the light emission period $T_{Emit}$, and a period during which the light emission control signal En is at the logic high level may be the non-light-emission period.

In FIG. 5A, a host (e.g., the host 200 of FIG. 1) and a display driving circuit (e.g., the display driving circuit 110 of FIG. 1) may be in communication with each other. An internal clock signal of the display driving circuit and a clock signal generated by the host may be synchronized with each other. When the scan signal Sn is at the logic high level, the light emission control signal En may be at the logic low level that is the inactive level. When the scan signal Sn is at the logic high level, the image signal Dm may be input to the pixel PX'. In other words, when the light emission control signal En is at the inactive level, the image signal Dm may be provided to the display panel. In the period of the light emission control signal En, the image signal Dm may be provided to the display panel in a part of a period during which the light emission control signal En is at the inactive level. A part of a period during which the light emission control signal En is at the inactive level may be a data provision time period. Because the internal clock signal of the display driving circuit and the clock signal generated by the host are synchronized with each other, the period of the light emission control signal En may be constant. As shown in FIG. 5A, the light emission control signal may have the inactive level from a first time point t1 to a second time point t2 and have the active level from the second time point t2.

FIG. 5B is a diagram for describing a case in which communication between a host and a display driving circuit is not seamless. For example, FIG. 5B is a diagram for describing a case in which communication between the host and the display driving circuit is not seamless in a low-power mode. In FIG. 5B, the host (e.g., the host 200 of FIG. 1) and the display driving circuit (e.g., the display driving circuit 110 of FIG. 1) may not be in communication with each other. An internal clock signal of the display driving circuit and the clock signal generated by the host may be asynchronous with each other.

In an embodiment, the display panel 120*a* may be produced through a low-temperature polycrystalline oxide (LTPO) process. The display panel 120*a* may be driven at a low frame rate. When the display panel 120*a* is driven at the low frame rate in the video mode, the host (e.g., the host 200 of FIG. 1) may enter the low-power mode. While the host enters the low-power mode, at least some of the components of the host for driving the display panel may be driven with low power or may be powered off. The low-power mode may be maintained for a plurality of vertical periods. The vertical period may correspond to one frame period. The low-power mode is operated with low power for the plurality of vertical periods, e.g., for a longer period than the low-power mode is operated with low power for a plurality of horizontal periods, and thus, power consumption may be reduced. When the host enters the low-power mode, a display processor (e.g., the display processor 210 of FIG. 1) and an interface e.g., the interface 220 of FIG. 1) may be driven with low power. The host may control some components of the display driving circuit for driving the display panel in the low-power mode to be driven with low power.

When the host enters the low-power mode, communication between the host and the display driving circuit may not be seamless. Accordingly, an internal clock signal of the display driving circuit and a clock signal generated by the host may be asynchronous with each other. The host, which has entered the low-power mode in an asynchronous state, may wake up and transmit image data to the display driving circuit. When the display driving circuit receives the image data from the host in a period other than a data provision time period, the light emission period $T_{Emit}$ may change and flicker may occur.

FIG. 5B illustrates a case in which the internal clock signal of the display driving circuit and the clock signal generated by the host are asynchronous with each other. When the light emission control signal En is at the active level, the level of the scan signal Sn becomes an active level, such that the image signal Dm corresponding to image data Dn may be input to the pixel PX'. The image signal Dm may be input to the pixel PK' in a period other than the data provision time period. The level of the scan signal Sn becomes the active level at a third time point t3, and thus, the light emission control signal En may be controlled to be at the inactive level. A light emission period $T_{Emit\_w}$ during which the light emission control signal En is activated may be reduced, and the brightness of the pixel PX' may change. A decrease in the light emission period $T_{Emit\_w}$ may cause an issue on the brightness of an image to be displayed, and thus, resynchronization of the display driving circuit and the host is required to allow the display driving circuit to receive image data from the host in a data provision time period. In other words, it is necessary for the host having entered the low-power mode to wake up and transmit image data to the display driving circuit in the data provision time period.

The display driving circuit according to an embodiment of the inventive concept may receive image data in a data provision time period. The display driving circuit may receive, in the data provision time period, image data from the host having entered the low-power mode. The display driving circuit may control the level of a second interrupt signal based on the data provision time period and receive image data from the host based on the second interrupt signal. Accordingly, the light emission period $T_{Emit\_w}$ may not be reduced, and issues on the image quality and brightness of an image to be displayed on the display panel 120*a* may be improved. Hereinafter, further detailed descriptions are provided with reference to FIG. 6.

Figure 6:
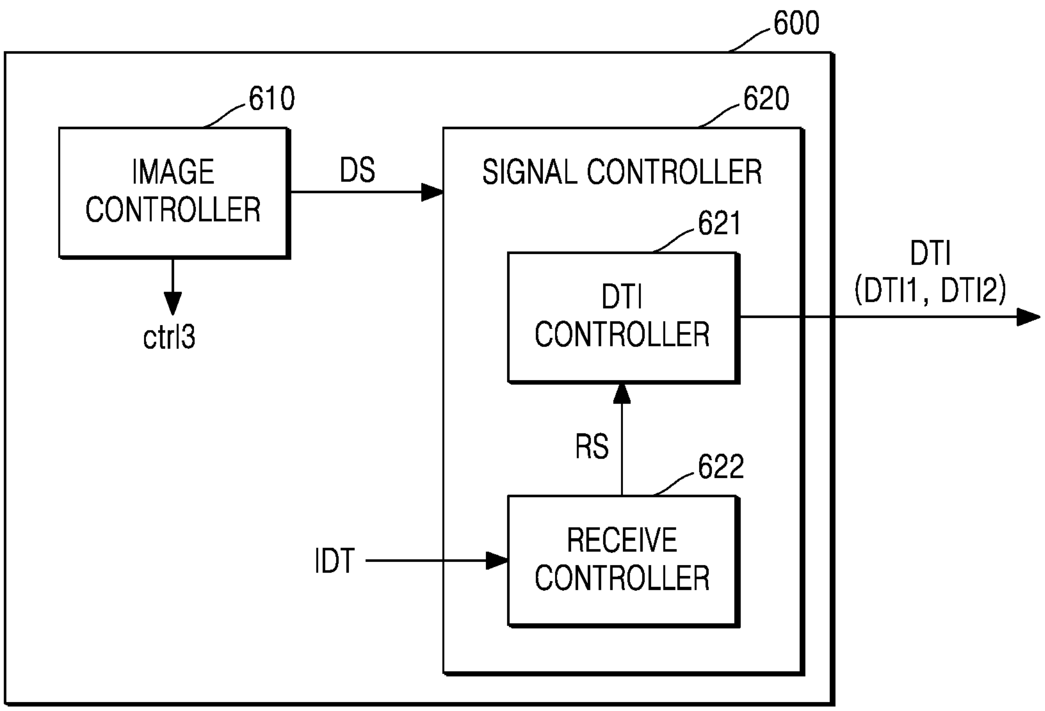
FIG. 6 is a block diagram illustrating a configuration of a timing controller according to an embodiment of the inventive concept.

FIG. 6 is a block diagram illustrating a configuration of a timing controller 600 according to an embodiment of the inventive concept. The timing controller 600 of FIG. 6 may correspond to the timing controller 113 of FIG. 2, and thus, redundant descriptions thereof may be omitted.

Referring to FIG. 6, the timing controller 600 may include an image controller 610 and a signal controller 620. The image controller 610 may determine a time period (hereinafter, referred to as a data provision time period) during which a display driving circuit (e.g., the display driving circuit 110 of FIG. 1) may provide a display panel (e.g., the display panel 120*a* of FIG. 3) with image signals corresponding to the image data IDT.

The timing controller 600 may determine the data provision time period. The timing controller 600 may generate a control signal ctrl3 for controlling a light emission control signal (e.g., the light emission control signal En of FIG. 5) based on light emission information. The light emission information may include timing information of the light emission control signal En. The timing controller 600 may determine the data provision time period based on the light emission information. For example, the image controller 610 may determine the data provision time period based on the light emission information. The image controller 610 may determine the data provision time period based on the light emission control signal En.

The image controller 610 may determine the data provision time period and generate a determination signal DS. The image controller 610 may provide the determination signal DS to the signal controller 620. The determination signal DS may include information about the data provision time period. For example, the image controller 610 may generate the determination signal DS to be at an active level during the data provision time period and to be at an inactive level during a period other than the data provision e period. However, the inventive concept is not limited thereto.

In an embodiment, the image controller 610 may determine the data provision time period based on a time point at which the level of the light emission control signal En changes. At least a part of a period in which the light emission control signal En is at the inactive level may be the data provision time period. The image controller 610 may determine, as the data provision time period, at least a part of a period in which the light emission control signal En is at the inactive level. For example, the image controller 610 may determine, as the data provision time period, a period between a first time point later by a preset time period than a time point at which the level of the light emission control signal En changes from the active level to the inactive level, and a second time point at which the level of the light emission control signal En changes from the inactive level to the active level. The first time point may be a predetermined period of time that lapses after the level of the light emission control signal En changes from the active level to the inactive level. The image controller 610 may maintain the determination signal DS at the active level from the first time point to the second time point.

The timing controller 600 may generate the interrupt signal DTI. The timing controller 600 may transmit the interrupt signal DTI to the host. The timing controller 600 may generate the first interrupt signal DTI1. The first interrupt signal DTI1 may be a signal for waking up the host.

The timing controller 600 may generate the second interrupt signal DTI2. The second interrupt signal DTI2 may be an interrupt signal generated after the first interrupt signal DTI1 is generated. The second interrupt signal DTI2 may request the host to transmit the image data IDT regarding a next frame.

The signal controller 620 may include a DTI controller 621 and a receive controller 622. The DTI controller 621 may generate the interrupt signal DTI. The DTI controller 621 may transmit the interrupt signal DTI to the host.

The timing controller 600 may control the level of the second interrupt signal DTI2. The timing controller 600 may control the level of the second interrupt signal DTI2 based on the data provision time period. The timing controller 600 may determine the data provision time period based on a light emission control signal, and control the level of the second interrupt signal DTI2 based on the data provision time period.

The timing controller 600 may control the level of the second interrupt signal DTI2 such that the image data IDT is received during the data provision time period. The level of the second interrupt signal DTI2 may be an active level or an inactive level. For example, when the level of the second interrupt signal DTI2 is the active level, the second interrupt signal DTI2 may be at a logic high level, and when the level of the second interrupt signal DTI2 is the inactive level, the second interrupt signal DTI2 may be at a logic low level. However, the inventive concept is not limited thereto, and when the level of the second interrupt signal DTI2 is the active level, the second interrupt signal DTI2 may be at a logic low level, and when the level of the second interrupt signal DTI2 is the inactive level, the second interrupt signal DTI2 may be at a logic high level.

The DTI controller 621 may control the level of the interrupt signal DTI. The DTI controller 621 may control the level of the second interrupt signal DTI2 based on the data provision time period.

The DTI controller 621 may control, based on the data provision time period, the second interrupt signal DTI2 to be at the active level. In an embodiment, the DTI controller 621 may control the second interrupt signal DTI2 to be at the active level in at least a part of the data provision time period. The DTI controller 621 may receive the generated determination signal DS from the image controller 610. The DTI controller 621 may control, based on the determination signal DS, the second interrupt signal DTI2 to be at the active level. For example, based on the determination signal DS that is at the active level, the DTI controller 621 may control the second interrupt signal DTI2 to be at the logic high level that is the active level. The DTI controller 621 may control the second interrupt signal DTI2 to be at the active level in at least a part of a period during which the determination signal DS is at the active level.

Based on a time point at which the level of the emission control signal changes, the DTI controller 621 may control the second interrupt signal DTI2 to be at the active level. Because the data provision time period is determined based on the time point at which the level of the light emission control signal changes, the second interrupt signal DTI2 may be controlled based on the time point at which the level of the light emission control signal changes. The second interrupt signal DTI2 may be controlled such that the host starts transmission of the image data IDT in the data provision time period.

In an embodiment, the DTI controller 621 may control the second interrupt signal DTI2 to be at the active level for a second time period from a time point later by a first time period than a time point at which the level of the light emission control signal changes from the active level to the inactive level. In an embodiment, the DTI controller 621 may control the second interrupt signal DTI2 to be at the active level for a fourth time period from a time point earlier by a third time period than the time point at which the level of the light emission control signal changes from the active level to the inactive level. However, the inventive concept is not limited thereto. The first, second, third, and fourth time periods described above may be arbitrary time periods.

The DTI controller 621 may transmit the interrupt signal DTI to the host. The host may receive the first interrupt signal DTI1 and wake up from the low-power mode. The host may wake up and then prepare to transmit the image data IDT. The host may receive the second interrupt signal DTI2 after receiving the first interrupt signal DTI1. When the preparation is completed, the host may transmit the image data IDT to the timing controller 600 based on the second interrupt signal DTI2. The timing controller 600 may receive the image data IDT from the host. The timing controller 600 may receive the image data IDT from the host through an interface.

Based on at least one of the level of the second interrupt signal DTI2 and a change in the level of the second interrupt signal DTI2, the host may determine whether to transmit the image data IDT to the display driving circuit. In an embodiment, after completely preparing to transmit the image data IDT based on the first interrupt signal DTI1, the host may transmit the image data IDT in synchronization with a time point at which the level of the second interrupt signal DTI2 changes. For example, the host may transmit the image data IDT at a rising edge of the second interrupt signal DTI2. In another embodiment, the host may transmit the image data IDT at a falling edge of the second interrupt signal DTI2.

In an embodiment, after completely preparing to transmit THE image data IDT based on the first interrupt signal DTI, the host may transmit the image data. IDT when the second interrupt signal DTI2 is at the active level. The host may start transmission of the image data IDT to the display driving circuit when the second interrupt signal DTI2 is at the active level when the preparation for transmission of the image data IDT is completed. When the host has completed the preparation for transmission of the image data IDT but the second interrupt signal DTI2 is at the inactive level at a time point of transmission of the image data IDT, the host cannot transmit the image data IDT to the display driving circuit. When the preparation for transmission of the image data IDT has been completed and the second interrupt signal DTI2 is at the inactive level, the host may wait for the level of the second interrupt signal DTI2 to be the active level and then transmit the image data IDT to the display driving circuit.

The timing controller 600 may determine whether image data IDT has been received from the host. For example, the receive controller 622 may determine whether the image data IDT has been received from the host. The receive controller 622 may determine whether the image data IDT has been received from the host based on the second interrupt signal DTI2. The receive controller 622 may generate a reception signal RS based on whether the image data IDT has been received. The receive controller 622 may transmit the reception signal RS to the DTI controller 621.

The receive controller 622 may determine, based on a time point at which the level of the second interrupt signal DTI2 changes, that the image data IDT has started to be received. In an embodiment, the receive controller 622 may determine, based on a time point at which the level of the second interrupt signal DTI2 changes from the inactive level to the active level, that the image data IDT has started to be received. For example, the receive controller 622 may determine whether the image data IDT has started to be received within a preset time period from the time point at which the level of the second interrupt signal DTI2 changes from the inactive level to the active level. The receive controller 622 may generate the reception signal RS when the image data IDT is received from the host within the preset time period from the time point at which the level of the second interrupt signal DTI2 changes from the inactive level to the active level. The receive controller 622 may not generate the reception signal RS when the image data IDT is not received from the host.

In an embodiment, the receive controller 622 may determine, based on the level of the second interrupt signal DTI2, that the image data IDT has started to be received. The receive controller 622 may determine whether the image data IDT has started to be received when the second interrupt signal DTI2 is at the active level. The receive controller 622 may generate the reception signal RS when the image data IDT is received from the host when the second interrupt signal DTI2 is at the active level. The receive controller 622 may not generate the reception signal RS when the image data IDT is not received from the host.

The timing controller 600 may control the level of the second interrupt signal DTI2 based on whether the image data IDT has been received. When it is determined that the image data IDT has started to be received, the timing controller 600 may control the second interrupt signal DTI2 to be at the inactive level. When the image data IDT has started to be received, the timing controller 600 may control, immediately or after a preset time period, the second interrupt signal DTI2 to be at the inactive level.

When it is determined that the image data IDT has not started to be received, the timing controller 600 may control the level of the second interrupt signal DTI2 based on the data provision time period. The timing controller 600 may continue to control the second interrupt signal DTI2 based on the data provision time period.

For example, the DTI controller 621 may control the level of the second interrupt signal DTI2 based on whether the image data IDT has been received. The DTI controller 621 may control the level of the second interrupt signal DTI2 based on the reception signal RS. The DTI controller 621 having received the image data IDT may control the second interrupt signal DTI2 to be at the inactive level.

The DTI controller 621 having received the reception signal RS may control the second interrupt signal DTI2 to be at the inactive level. When the DTI controller 621 receives the reception signal RS while controlling the second interrupt signal DTI2 based on the determination signal DS, the DTI controller 621 may control the second interrupt signal DTI2 to be at the inactive level. When the reception signal RS is received, the DTI controller 621 may control, immediately or after a preset time period, the second interrupt signal DTI2 to be at the inactive level. The DTI controller 621 having received the reception signal RS may maintain the second interrupt signal DTI2 at the inactive level until the interrupt signal DTI is generated again to request transmission of the image data IDT regarding the next frame.

When the DTI controller 621 has not received the image data IDT, the DTI controller 621 may control the level of the second interrupt signal DTI2 based on the data provision time period. When the DTI controller 621 does not receive the reception signal RS, the DTI controller 621 may continue to control the level of the second interrupt signal DTI2 based on the data provision time period. The DTI controller 621 may control the level of the second interrupt signal DTI2 based on the determination signal DS until the reception signal RS is received.

Although FIG. 6 illustrates the image controller 610 and the signal controller 620 as separate logic units, the timing controller 600 may be implemented as a single logic unit. The image controller 610 and the signal controller 620 are examples of logic units implemented according to functions of the timing controller 600, and the implementation of the timing controller 600 is not limited to that illustrated in FIG. 6.

Figure 7:
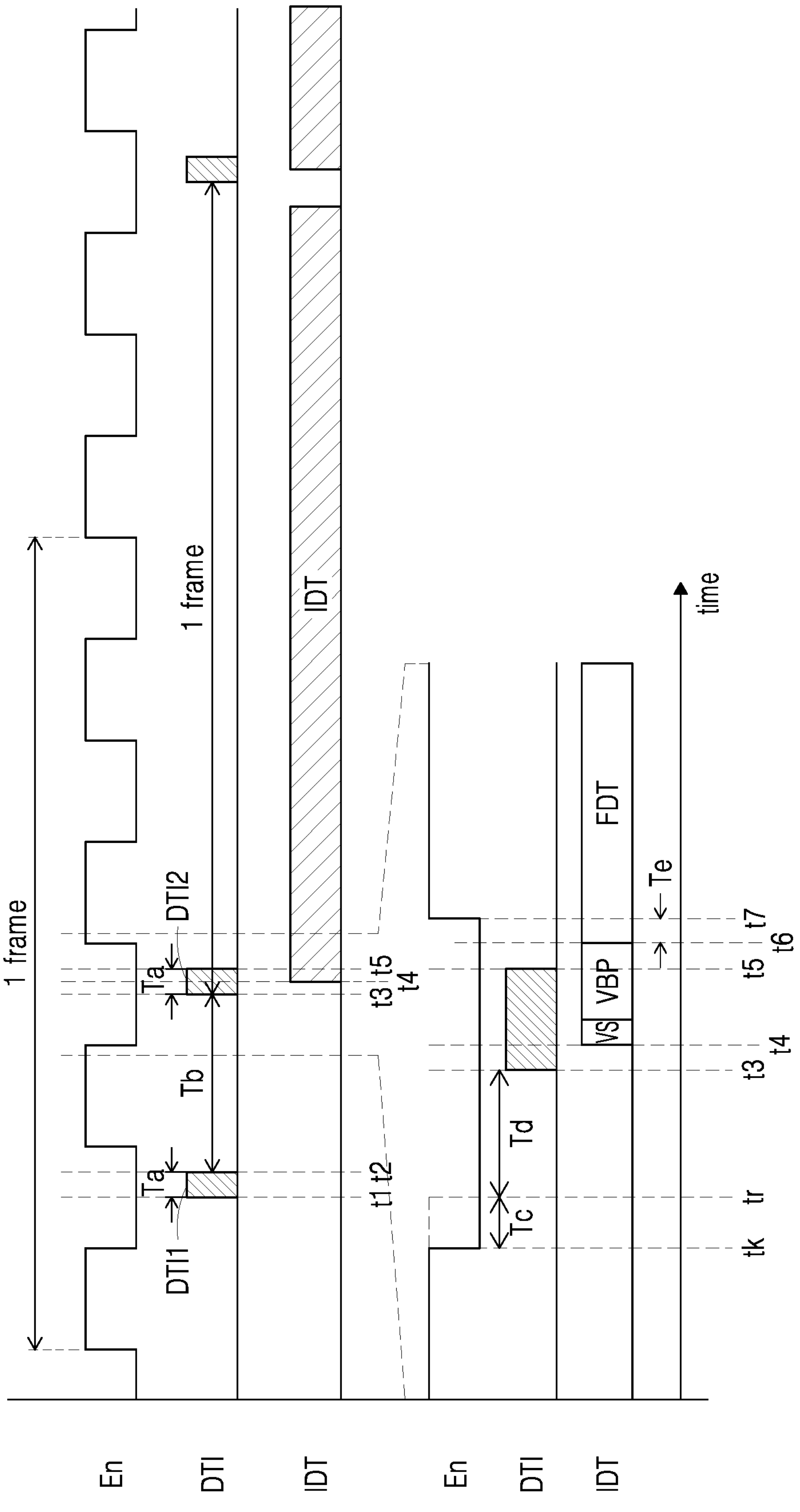
FIG. 7 is a diagram for describing an interrupt signal and a light emission control signal according to an embodiment of the inventive concept.

FIG. 7 is a diagram for describing an interrupt signal and a light emission control signal according to an embodiment of the inventive concept.

Referring to FIG. 7, the luminance of a display panel (e.g., the display panel 120*a* of FIG. 3) may be adjusted based on several light emission control signals En during one frame. The sum of periods during which the light emission control signal En is active within one frame as illustrated in FIG. 7 may be equal to the light emission period $T_{Emit}$ of FIG. 5.

A timing controller may generate the first interrupt signal DTI1. The timing controller may control the first interrupt signal DTI1 to be at the active level during a first period Ta from a time point t1. The host may receive the first interrupt signal DTI1. The host may prepare to transmit the image data IDT to the display driving circuit. When the host completes the preparation based on the first interrupt signal DTI1, the host may transmit the image data IDT based on the second interrupt signal DTI2. The timing controller may generate the second interrupt signal DTI2 at a third time point t3, which is later by a second period Tb than a second time point t2.

The timing controller may control the level of the second interrupt signal DTI2 based on the light emission control signal En. For example, the level of the second interrupt signal DTI2 may be a logic high level when the level of the light emission control signal En is a logic low level. The timing controller may determine the data provision time period based on the light emission control signal En. The timing controller may control the second interrupt signal DTI2 based on the data provision time period. For example, the timing controller may determine, as the data provision time period, a period between a time point tr that corresponds to the maximum time of a light emission period of the light emission control signal En, and a seventh time point t7. The level of the light emission control signal En may change from the inactive level to the active level at the seventh time point t7. The timing controller may control the second interrupt signal DTI2 to be at the active level in at least a part of the data provision time period. The timing controller may control the second interrupt signal DTI2 to be at the active level during the first period Ta from the third time point t3.

The timing controller may control the second interrupt signal DTI2 based on a time point when the level of the light emission control signal En changes. The timing controller may control the second interrupt signal DTI2 to be at the active level, based on a time point at which the level of the light emission control signal En changes from the active level to the inactive level. In other words, the second interrupt signal DTI2 may be at the active level when the light emission control signal En is at the inactive level. The timing controller may control the second interrupt signal DTI2 to be at the active level after a fourth period Td from the time point tr. The timing controller may control the second interrupt signal DTI2 to be at the active level after a third period Tc and the fourth period Td from a time point tk at which the level of the light emission control signal En changes from the active level to the inactive level. Although FIG. 7 illustrates that the second interrupt signal DTI2 is at the active level after the time point Tr, the inventive concept is not limited thereto. The second interrupt signal DTI2 may be controlled such that image data IDT is received by the display driving circuit during the data provision time period. The second interrupt signal DTI2 may be controlled to be at the active level before the time point tr.

The timing controller may receive the image data IDT from the host having completed the preparation for transmission of the image data IDT. The host may complete the preparation at a fourth time point t4 and then transmit the image data IDT, and the host may complete the preparation before the fourth time point t4, and transmit the image data IDT at the fourth time point t4, which is later by a preset period than the third time point t3 at which the interrupt signal DTI is at the active level. However, the inventive concept is not limited thereto, and the host may complete the preparation before the third time point t3 and transmit the image data IDT at the third time point t3, which is a rising edge of the second interrupt signal DTI2. At the fourth time point t4 at which the second interrupt signal DTI2 is at the active level, the display driving circuit may receive the image data IDT from the host. The display driving circuit may sequentially receive a vertical synchronization packet VS, a vertical back porch packet VBP, and frame data FDT.

The timing controller may start to receive the image data IDT at the fourth time point t4. In an embodiment, when the vertical synchronization packet VS is received, it may be determined that the image data IDT has started to be received. The timing controller may maintain the second interrupt signal DTI2 at the active level for the first period Ta from the third time point t3, and then control the second interrupt signal DTI2 to be at the inactive level from a fifth time point t5. For example, the second interrupt signal DTI2 may be at the inactive level while the majority of the image data IDT is received. However, the inventive concept is not limited thereto, and the timing controller may control the second interrupt signal DTI2 to be in an inactive state from the fourth time point t4 at which the image data IDT is received.

A fifth period Te refers to a period between a time point at which the vertical back porch packet VBP is received and a time point at which the next light emission control signal En transitions to an active state. The fifth period Te may be controlled based on at least one of the scan signal Sn, the light emission control signal En, and the size of a data buffer included in the display driving circuit.

Figure 8:
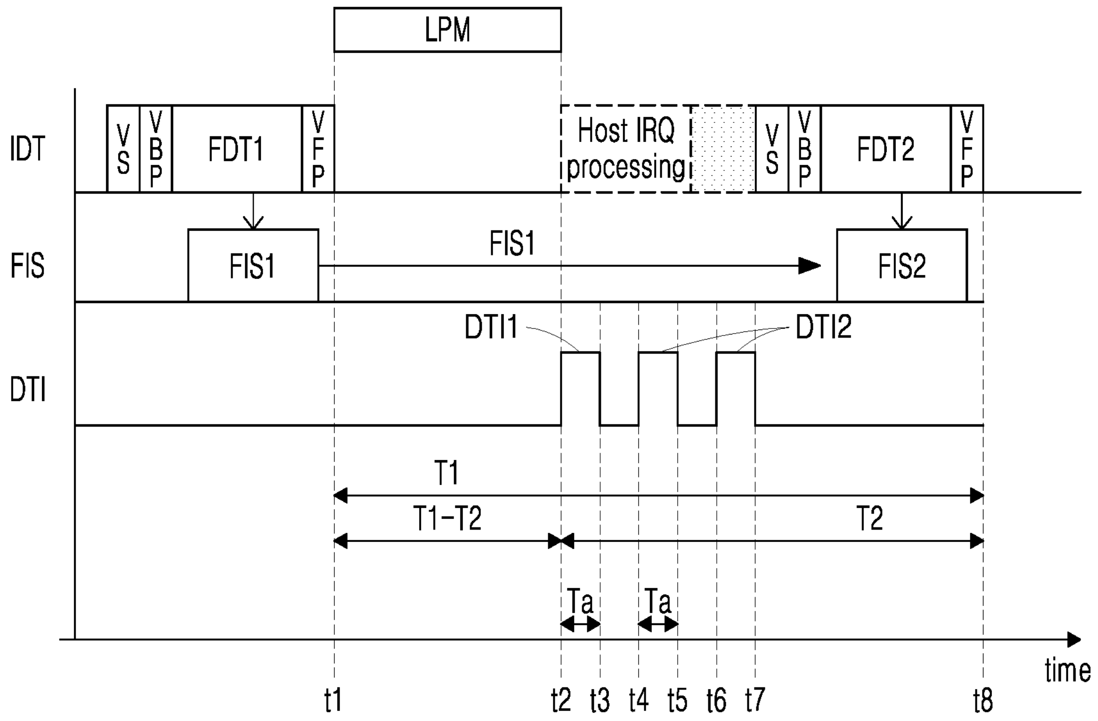
FIG. 8 is a diagram for describing operations of a display driving circuit according to an embodiment of the inventive concept.

FIGS. 8 to 11 are timing diagrams for describing operations of a display driving circuit according to an embodiment of the inventive concept. FIG. 8 is a diagram for describing operations of a display driving circuit according to an embodiment of the inventive concept. Hereinafter, descriptions are provided with reference to FIGS. 8 to 11, without those already provided above.

Referring to FIGS. 6 and 8, the display driving circuit may receive the image data IDT from the host. The image data IDT may include frame data FDT1, FDT2, and FDT3 (hereinafter, also referred to as the first, second and third frame data FDT1, FDT2, and FDT3), the vertical synchronization packet VS, the vertical back porch packet VBP, and a vertical front porch packet VFP. Here, the packet may be a set of bits. An image may be displayed on a display panel according to frame image signals FIS1, FIS2, and FIS3 (hereinafter, also referred to as the first, second and third frame image signals FIS1, FIS2, and FIS3) corresponding to the frame data FDT1, FDT2, and FDT3, respectively. The first frame image signal FIS1 may correspond to the first frame data FDT1, the second frame image signal FIS2 may correspond to the second frame data FDT2, and the third frame image signal FIS3 may correspond to the third frame data FDT3. The timing controller 600 may generate a vertical synchronization signal based on the vertical synchronization packet VS. The vertical synchronization signal may have a vertical period, which may include a vertical back porch period and a vertical front porch period. The vertical back porch period and the vertical front porch period may be controlled based on the vertical back porch packet VBP and the vertical front porch packet VFP.

The timing controller 600 may generate the interrupt signal DTI. The first interrupt signal DTI1 corresponding to the second frame data FDT2 may be generated at the second time point t2.

In an embodiment, the timing controller 600 may generate the first interrupt signal DTI1 based on a preset reference time period T2. The reference time period. T2 may refer to a time period during which the host prepares to transmit the image data IDT to the display driving circuit and then completes the transmission. The timing controller 600 may generate the first interrupt signal DTI1 based on a difference between a time point at the start of the reference time period T2 and a time point at the start of an update period T1. The start of the update period T1 may correspond to a time point at which the image data IDT regarding the current frame is completely received. In other words, the timing controller 600 may generate the first interrupt signal DTI1 after the difference in time period (T1−T2) from the time point at which the image data IDT regarding the current frame is completely received. The update period T1 may be a time period from the time point at which the image data IDT regarding the current frame is completely received to a time point at which the image data IDT regarding the next frame needs to be received and then displayed on the display panel, such that an issue with image quality does not occur. The difference in time period (T1−T2) may be the difference between the update period T1 and the reference time period T2.

The host may transmit the image data IDT to the display driving circuit. The first frame data FDT1, the second frame data FDT2, and the third frame data FDT3 may be sequentially received by the display driving circuit from the host. The host may enter a low-power mode LPM after transmitting the first frame data FDT1 to the display driving circuit. The host may enter the low-power mode LPM at the first time point t1 after transmitting the first frame data FDT1 to the timing controller 600.

The timing controller 600 may generate the first interrupt signal DTI1. The timing controller 600 may generate the first interrupt signal DTI1 at the second time point t2. For example, the DTI controller 621 may generate the first interrupt signal DTI1 at the second time point t2 and control the first interrupt signal DTI1 to be at the active level during the first period Ta. The DTI controller 621 may control the first interrupt signal DTI1 to be at the logic high level, which is the active level, from the second time point t2 to the third time point t3.

The host may receive the first interrupt signal DTI1 at the active level generated at the second time point t2. The host may perform interrupt request (IRQ) processing in response to the first interrupt signal DTI1 at the active level. The IRQ processing may refer to a process, performed by the host, of preparing to transmit the image data IDT to the display driving circuit in response to the first interrupt signal DTI1. After the host completes the IRQ processing, the host may transmit the image data IDT to the display driving circuit. The host may transmit the image data IDT based on the second interrupt signal DTI2.

In the period between the second time point t2 and the third time point t3, the host is performing the IRQ processing, and thus the image data IDT including the second frame data FDT2 may not be transmitted. The timing controller 600 may generate the second interrupt signal DTI2 after generating the first interrupt signal DTI1. The second interrupt signal DTI2 may be an interrupt signal generated after the first interrupt signal DTI1. The timing controller 600 may control the second interrupt signal DTI2 based on the data provision time period after the third time point t3.

The second interrupt signal DTI2 may be a signal for requesting the host to transmit the image data IDT regarding the next frame. The DTI controller 621 may control the second interrupt signal DTI2 to be at the active level during the period between the fourth time point t4 and the fifth time point t5. The fourth time point t4 and the fifth time point t5 may be determined based on the data provision time period. In the period between the fourth time point t4 and the fifth time point t5, the host is performing the IRQ processing to transmit the image data IDT including the second frame data FDT2, and thus the image data IDT may not be transmitted.

The receive controller 622 may determine whether the image data IDT has been received within a preset period from the fourth time point t4. With reference to FIG. 8, it is described that the receive controller 622 determines whether the image data IDT has been received within a period during which the second interrupt signal DTI2 is at the active level. The receive controller 622 does not receive the image data IDT in the period between the fourth time point t4 and the fifth time point t5, and thus the receive controller 622 may not generate the reception signal RS. The DTI controller 621 may continue to control the second interrupt signal DTI2 based on the data provision time period. The DTI controller 621 may control the second interrupt signal DTI2 to be at the inactive level during the period between the fifth time point t5 and a sixth time point t6.

The DTI controller 621 may control the second interrupt signal DTI2 to be at the active level again during the period between the sixth time point t6 and the seventh time point t7. In the period between the sixth time point t6 and the seventh time point t7, the host may start to transmit the image data IDT when it is able to transmit the image data IDT. For example, since the IRQ processing has been completed before the seventh time point t7, the host may transmit the image data IDT to the display driving circuit. In addition, since the second interrupt signal DTI2 is at the active level at the seventh time point t7, the host may transmit the image data IDT to the display driving circuit.

The timing controller 600 may start to receive the image data IDT at the seventh time point t7. Although FIG. 8 illustrates that the image data IDT starts to be received at the seventh time point t7, the inventive concept is not limited thereto, and the image data IDT may start to be received at a time point between the sixth time point t6 and the seventh time point t7. The timing controller 600 may determine that the image data IDT has started to be received, and then control the second interrupt signal DTI2 to be at the inactive level. In addition, at the seventh time point t7, the second interrupt signal DTI2 may be immediately controlled to be at the inactive level, or may be maintained at the active level for the first period Ta and then controlled to be at the inactive level.

For example, the receive controller 622 may determine that the image data IDT has been received at the seventh time point t7 and generate the reception signal RS. When the vertical synchronization packet VS is received, the receive controller 622 may determine that the image data IDT has started to be received. The DTI controller 621 may receive the reception signal RS and then control the second interrupt signal DTI2 to be at the inactive level. The DTI controller 621 may control the second interrupt signal DTI2 to be at the inactive level from the seventh time point t7. The DTI controller 621 may control the second interrupt signal DTI2 to be at the inactive level until transmission of the third frame data FDT3 is requested. Although FIG. 8 illustrates that the periods during which the first interrupt signal DTI1 and the second interrupt signal DTI2 are at the active level are equal to the first period Ta, the inventive concept is not limited thereto, and the periods during which the first interrupt signal DTI1 and the second interrupt signal DTI2 are at the active level may vary.

The host having entered the low-power mode may transmit the image data IDT to the display driving circuit based on the interrupt signal DTI. The timing controller 600 may receive, based on the second interrupt signal DTI2, the image data IDT during the data provision time period, and the host and the display driving circuit may be resynchronized with each other.

Figure 9:
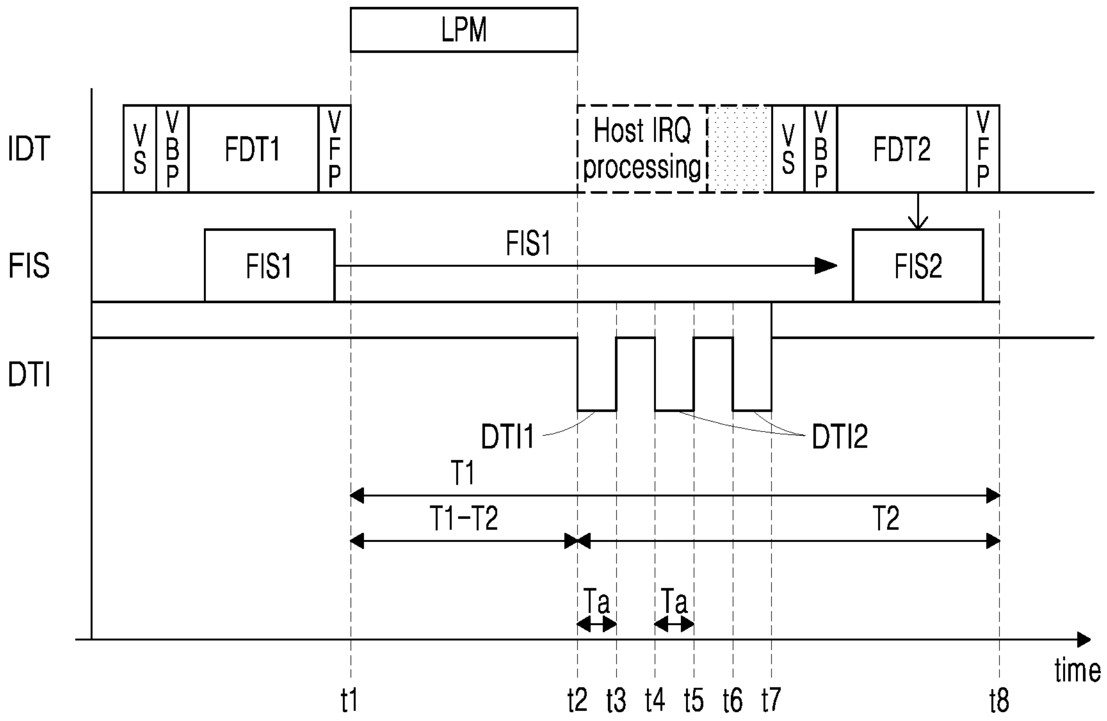
FIG. 9 is a diagram for describing logic levels of interrupt signals.

FIG. 9 is a diagram for describing logic levels of interrupt signals. The logic levels of the interrupt signal DTI of FIG. 9 may be different from those of FIG. 8. Hereinafter, descriptions that are already provided above with reference to FIG. 8 may be omitted.

Referring to FIGS. 6 and 9, the host may enter the low-power mode LPM after transmitting the first frame data FDT1 to the display driving circuit. The host may enter the low-power mode LPM at the first time point t1.

The interrupt signal DTI may be implemented to be at the logic high level when it is at the inactive level, and to be at the logic low level when it is at the active level. The DTI controller 621 may generate the first interrupt signal DTI1 at the second time point t2. The DTI controller 621 may control the first interrupt signal DTI1 to be at the logic low level, which is the active level, during the period between the second time point t2 and the third time point t3. The timing controller 600 may generate the second interrupt signal DTI2 after generating the first interrupt signal DTI1. The timing controller 600 may control the second interrupt signal DTI2 based on the data provision time period after the third time point t3.

The DTI controller 621 may control the second interrupt signal DTI2 to be at the logic low level during the period between the fourth time point t4 and the fifth time point t5. The DTI controller 621 may control the second interrupt signal DTI2 to be at the logic high level during the period between the fifth time point t5 and the sixth time point t6. The DTI controller 621 may control the second interrupt signal DTI2 to be at the logic low level during the period between the sixth time point t6 and the seventh time point t7. As shown in FIG. 9, the first to seventh time points t1 to t7 may occur in sequence.

The second interrupt signal DTI2 is at the active level at the seventh time point t7, and thus the host may transmit the image data IDT to the display driving circuit. The DTI controller 621 may receive the reception signal RS and then control the second interrupt signal DTI2 to be at the inactive level. The DTI controller 621 may control the second interrupt signal DTI2 to be at the logic high level from the seventh time point t7.

Figure 10:
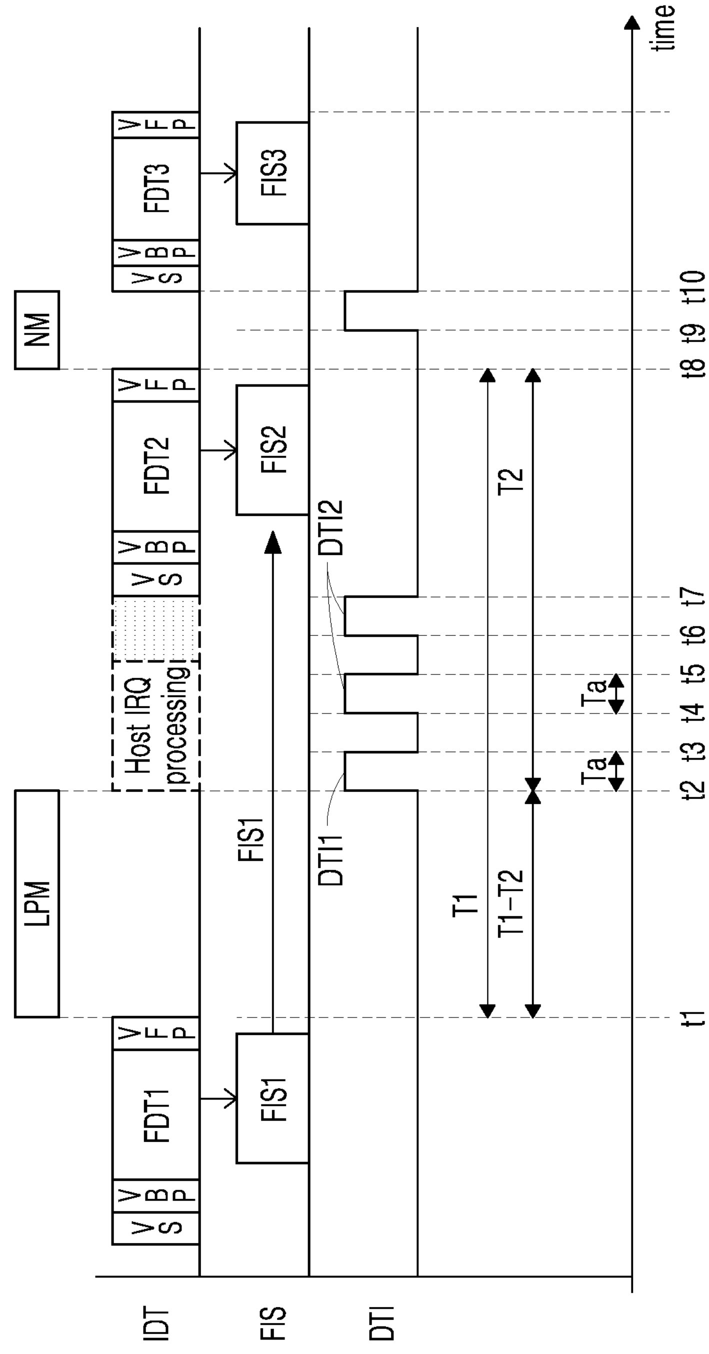
FIG. 10 is a timing diagram illustrating operations of a display driving circuit according to an embodiment of the inventive concept.

FIG. 10 is a timing diagram illustrating operations of a display driving circuit according to an embodiment of the inventive concept. FIG. 10 illustrates interrupt signals when a host enters a normal mode NM. Hereinafter, descriptions that are already provided above with reference to FIG. 8 may be omitted.

Referring to FIGS. 10 and 6, when the host enters the low-power mode LPM, the DTI controller 621 may generate the first interrupt signal DTI1 and the second interrupt signal DTI2. The DTI controller 621 may control, based on the data provision time period, the second interrupt signal DTI2 to be at the active level.

The receive controller 622 may generate the reception signal RS based on whether the image data IDT has started to be received. The receive controller 622 may transmit the reception signal RS to the DTI controller 621. The DTI controller 621 may control the level of the second interrupt signal DTI2 based on the reception signal RS. The DTI controller 621 having received the reception signal RS may control the second interrupt signal DTI2 to be at the inactive level. When the DTI controller 621 has not received the reception signal RS, the DTI controller 621 may continue to control the level of the second interrupt signal DTI2 based on the data provision time period.

The host may enter the normal mode NM after transmitting the second frame data FDT2 to the display driving circuit. The host may enter the normal mode NM at an eighth time point t8. In the normal mode NM, the host and the display driving circuit may communicate with each other. An internal clock signal of the display driving circuit and a clock signal generated by the host may be synchronized with each other.

When a second host enters the normal mode NM, the DTI controller 621 may generate the interrupt signal DTI. In the normal mode NM, the host and the display driving circuit are communicating with each other, and thus the interrupt signal DTI may be a signal for requesting the host to transmit the image data IDT regarding the next frame. The timing controller may control the interrupt signal DTI based on the data provision time period.

The DTI controller 621 may generate the interrupt signal DTI at a ninth time point t9. At the ninth time point t9, the DTI controller 621 may generate the interrupt signal DTI by controlling the interrupt signal DTI at the inactive level to be at the active level. At a tenth time point t10 that is later by a preset time period than the ninth time point t9 at which the interrupt signal DTI is generated, the DTI controller 621 may control the interrupt signal DTI to be at the inactive level.

The host may receive the interrupt signal DTI at the active level, which is generated at the ninth time point t9. The host may start to transmit the image data IDT in response to the interrupt signal DTI at the active level. The host may start to transmit the image data IDT in response to a rising edge of the interrupt signal DTI at the ninth time point t9, and may start to transmit the image data IDT in response to the interrupt signal DTI at the active level. The timing controller 600 may determine that the image data IDT has started to be received at the tenth time point t10.

Although FIG. 10 illustrates that the interrupt signal DTI corresponding to the third frame data FDT3 is controlled to be at the active level after the eighth time point t8, the inventive concept is not limited thereto. In normal mode NM, the interrupt signal DTI corresponding to the third frame data FDT3 may be generated before the eighth time point t8, and the vertical front porch packet VFP corresponding to the second frame data FDT2 and the vertical synchronization packet VS corresponding to the third frame data FDT3 may be continuously received. When the host enters the normal mode, communication between the host and the display driving circuit may be seamless. The internal clock signal of the display driving circuit and the clock signal generated by the host are continuously synchronized with each other, and thus the display driving circuit may receive the image data IDT from the host in the data provision time period.

Figure 11:
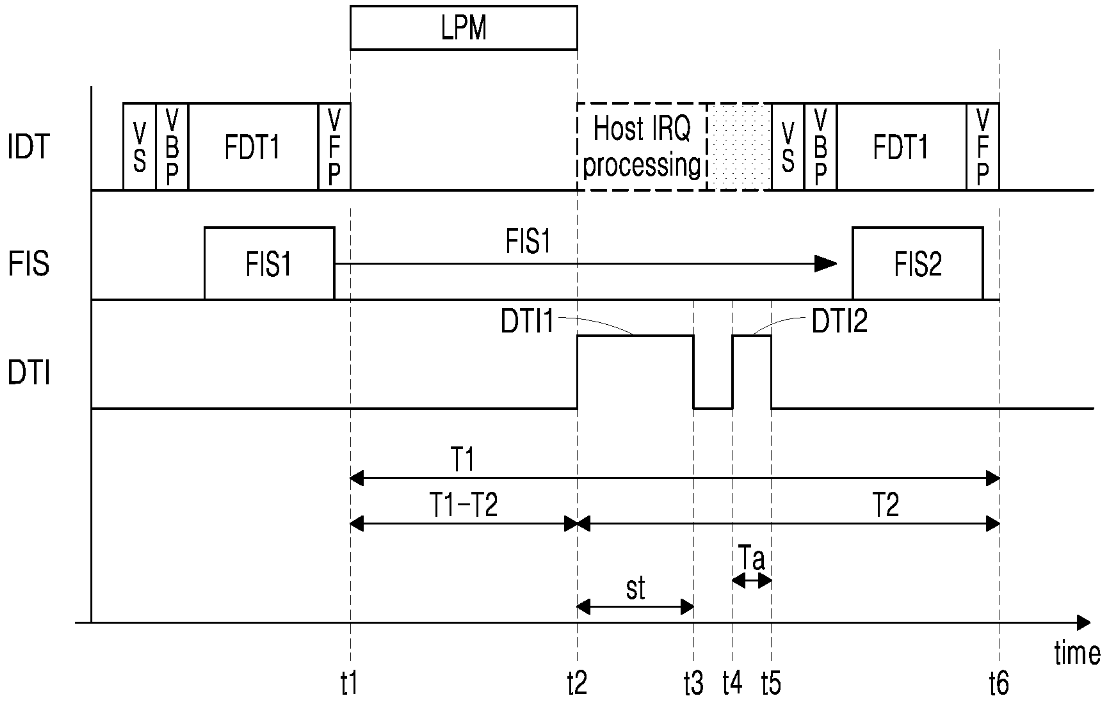
FIG. 11 is a diagram for describing control of interrupt signals according to an embodiment of the inventive concept.

FIG. 11 is a diagram for describing control of interrupt signals according to an embodiment of the inventive concept. Compared with FIG. 8, FIG. 11 illustrates a case in which the interrupt signal DTI is maintained at the active level during a preparation period st. Hereinafter, descriptions that are already provided above with reference to FIG. 8 may be omitted.

Referring to FIGS. 6 and 11, when the first interrupt signal DTI1 is generated, the timing controller 600 may maintain the first interrupt signal DTI1 at the active level during the preparation period st. In an embodiment, the preparation period st may be preset. The preset preparation period st may be determined based on a time period during which the host performs IRQ processing. For example, the preparation period st may be equal to or less than a time period during which the host performs IRQ processing. The timing controller 600 may maintain the first interrupt signal DTI1 at the active level during the preparation period st, and then control the level of the second interrupt signal DTI2 based on a light emission control signal. In other words, the timing controller 600 may maintain the first interrupt signal DTI1 at the active level during the preparation period st, and then control, based on the data provision time period, the second interrupt signal DTI2 to be at the active level.

The timing controller 600 may control the first interrupt signal DTI1 to be at the active level during the preparation period st from the second time point t2. The host may wake up based on the first interrupt signal DTI1 during the preparation period st. The host may wake up after receiving the first interrupt signal DTI1 at the active level during the preparation period st.

Periods during which the first interrupt signal DTI1 and the second interrupt signal DTI2 are at the active level may be different from each other. The preparation period st may be longer than the first period Ta during which the second interrupt signal DTI2 is at the active level. Even when the preparation period st is long and thus there is external noise in the interrupt signal DTI, the noise and the interrupt signal DTI may be distinguished from each other. The host may recognize the noise and the interrupt signal DTI for waking up, and wake up from the low-power mode based on the interrupt signal DTI during the preparation period st.

From the third time point t3, the timing controller 600 may control the level of the second interrupt signal DTI2 based on the light emission control signal. After the third time point t3, the timing controller 600 may control the second interrupt signal DTI2 to be at the active level based on the data provision time period. The timing controller 600 may control the second interrupt signal DTI2 to be at the active level at the fourth time point t4, which is later by a preset time period than a time point at which the level of the light emission control signal changes from the active level to the inactive level. The timing controller 600 may maintain the second interrupt signal DTI2 at the active level during the first period Ta.

For example, at the second time point t2, the DTI controller 621 may control the first interrupt signal DTI1 at the inactive level to be at the active level. The DTI controller 621 may maintain the first interrupt signal DTI1 at the active level during the preset preparation period st. The DTI controller 621 may maintain the first interrupt signal DTI1 at the active level during the period between the second time point t2 and the third time point t3.

The host may receive the first interrupt signal DTI1 at the active level generated at the second time point t2. The host may perform IRQ processing in response to the first interrupt signal DTI1 at the active level. When the host has completed preparation for transmission of the image data IDT to the display driving circuit, the host may start to transmit the image data IDT based on the second interrupt signal DTI2. After the third time point t3, the DTI controller 621 may control the level of the second interrupt signal DTI2 based on the data provision time period.

The DTI controller 621 may control the second interrupt signal DTI2 to be at the active level based on the data provision time period, during the period between the fourth time point t4 and the fifth time point t5. In the period between the fourth time point t4 and the fifth time point t5, the host may transmit the image data IDT when it is able to transmit the image data IDT. For example, in the case that the IRQ processing is completed before the fifth time point t5, the host may transmit the image data IDT. In addition, in the case that the second interrupt signal DTI2 is at the active level at the fifth time point t5, the host may transmit the image data IDT to the display driving circuit.

The receive controller 622 may determine that the image data IDT has started to be received at the fifth time point t5, and generate the reception signal RS. When the vertical synchronization packet VS is received, the receive controller 622 may determine that the image data IDT has started to be received. Although it is described that the host starts to transmit the image data IDT at the fifth time point t5 and the timing controller 600 starts to receive the image data IDT at the fifth time point t5, the host may start to transmit the image data IDT before the fifth time point t5, and the timing controller 600 may start to receive the image data IDT at the fifth time point t5. The DTI controller 621 may receive the reception signal RS and then control the second interrupt signal DTI2 to be at the inactive level. The DTI controller 621 may control the second interrupt signal DTI2 to be at the inactive level from the fifth time point t5.

Although it is described with reference to FIG. 11 that the preparation period st is preset, the inventive concept is not limited thereto. For example, the preparation period st may be determined based on the data provision time period. The timing controller 600 may maintain the first interrupt signal DTI1 at the active level during the preparation period st, and then control, based on the data provision time period, the second interrupt signal DTI2 to be at the inactive level. The preparation period st may be a period between a time point at which the first interrupt signal DTI1 is generated, and a time point at which the second interrupt signal DTI2 has its first falling edge based on the data provision time period. The first falling edge of the second interrupt signal DTI2 may be a falling edge of the first interrupt signal DTI1 at the time point t3 when the first interrupt signal DTI1 changes from the active level to the inactive level.

The timing controller 600 may control the first interrupt signal DTI1 to be at the active level at the second time point t2. After the second time point t2, the timing controller 600 may control the second interrupt signal DTI2 based on the data provision time period. After a preset time period from the second time point t2, the timing controller 600 may control the second interrupt signal DTI2 based on the data provision time period. The timing controller 600 may control the first interrupt signal DTI1 to be at the active level for a preset time period from the second time point t2, and then control the second interrupt signal DTI2 based on the data provision time period. Here, the interrupt signal for a preset time period from the second time point t2 may be the first interrupt signal DTI1, and the interrupt signal after the preset time period from the second time point t2 may be the second interrupt signal DTI2. In other words, the length of the preset time period may correspond to the length of the first interrupt signal DTI1 at the active level. At the third time point t3, the level of the second interrupt signal DTI2 may change from the active level to the inactive level. The timing controller 600 may control, based on the data provision time period, the second interrupt signal DTI2 to be at the inactive level at the third time point t3. The period between the second time point t2 and the third time point t3 may be the preparation period st.

The host may receive the first interrupt signal DTI1 at the active level generated at the second time point t2. The host may perform IRQ processing in response to the first interrupt signal DTI1 at the active level. When the host has completed preparation for transmission of the image data IDT to the display driving circuit, the host may start to transmit the image data IDT based on the second interrupt signal DTI2. The host may start to transmit the image data IDT in synchronization with a time point at which the level of the second interrupt signal DTI2 changes from the active level to the inactive level. The host may start to transmit the image data IDT at a falling edge of the second interrupt signal DTI2. When the host completes the preparation for transmission before the third time point t3, the host may start to transmit the image data IDT in synchronization with the falling edge of the second interrupt signal DTI2, at the third time point t3. However, the inventive concept is not limited thereto.

The timing controller 600 may control the second interrupt signal DTI2 based on the data provision time period, during the period between the third time point t3 and the fifth time point t5. Assuming that the host has completed the IRQ processing before the fifth time point t5, the host may transmit the image data IDT. The host may transmit the image data IDT to the display driving circuit in synchronization with the falling edge of the second interrupt signal DTI2, at the fifth time point t5.

Figure 12:
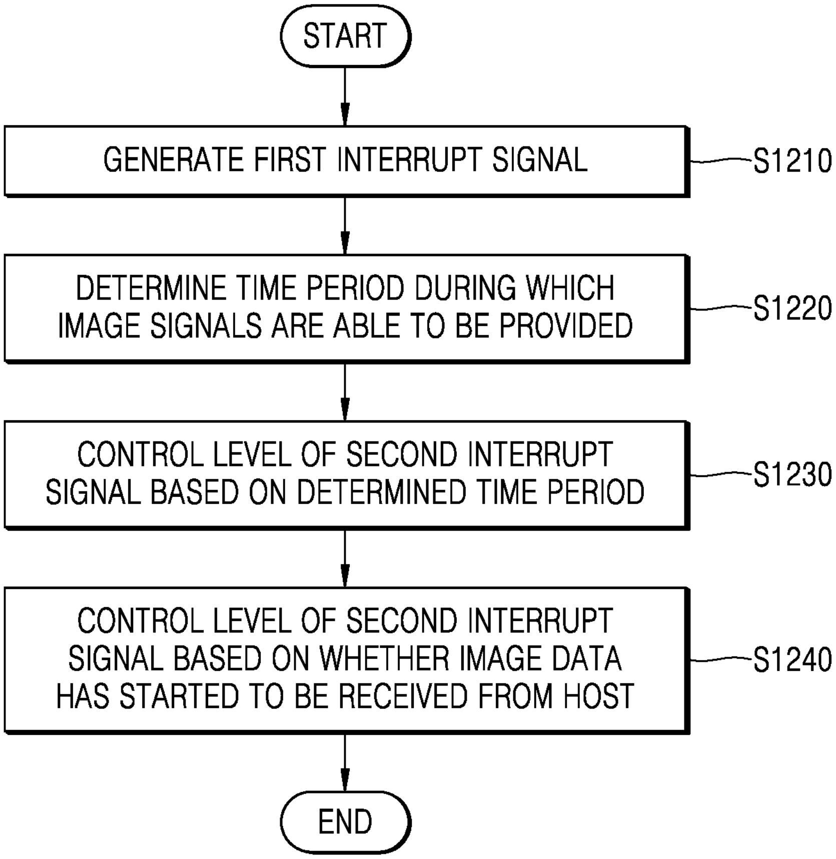
FIG. 12 is a flowchart illustrating an operation method of a display driving circuit according to an embodiment of the inventive concept.

FIG. 12 is a flowchart illustrating an operation method of a display driving circuit according to an embodiment of the inventive concept. For example, FIG. 12 illustrates an operation method of the timing controller 600 of FIG. 6.

In operation S1210, the display driving circuit may generate a first interrupt signal. The first interrupt signal may be a signal for waking up a host. The first interrupt signal may wake up the host that is in a low-power mode. The first interrupt signal may be generated based on an internal clock signal of the display driving circuit. The display driving circuit may control the first interrupt signal to be at an active level to wake up the host. The display driving circuit may transmit the first interrupt signal to the host. The host may receive the first interrupt signal and then wake up from the low-power mode. The host may prepare to transmit the image data in response to the first interrupt signal of the active level. When the preparation is completed, the host may wait to transmit the image data.

In operation S1220, the display driving circuit may determine a time period during which the display driving circuit is able to provide image signals. The display driving circuit may determine a data provision time period during which the display driving circuit is able to provide a display panel with image signals corresponding to image data. The display driving circuit may determine the data provision time period based on a light emission control signal. At least a part of a period in which the light emission control signal is at an inactive level may be the data provision time period. In an embodiment, the display driving circuit may determine the data provision time period based on a time point at which the level of the light emission control signal changes. For example, the display driving circuit may determine, as the data provision time period, a period between a first time point later by a preset time period than a time point at which the level of the light emission control signal changes from an active level to the inactive level, and a second time point at which the level of the light emission control signal changes from the inactive level to the active level.

In operation S1230, the display driving circuit may control the level of a second interrupt signal based on the data provision time period. The second interrupt signal may be an interrupt signal after the first interrupt signal is generated. The second interrupt signal may be an interrupt signal after the level of the first interrupt signal changes from the active level to the inactive level. The second interrupt signal may inform the host of the time to transmit image data regarding a next frame.

The display driving circuit may control the second interrupt signal to be at the active level such that the image data starts to be received from the host in the data provision time period. For example, the display driving circuit may control the second interrupt signal to be at the active level in at least a part of the data provision time period. However, the inventive concept is not limited thereto, and when there is a delay when the image data is transmitted from the host to the display driving circuit, the display driving circuit may control the second interrupt signal to be at the active level before the start of the data provision time period.

The display driving circuit may transmit the second interrupt signal to the host.

The host may receive the second interrupt signal. When the host completes its preparation for transmitting the image data, the host may transmit the image data to the display driving circuit based on the second interrupt signal. Based on at least one of the level of the second interrupt signal and a change in the level of the second interrupt signal, the host may determine whether to transmit the image data to the display driving circuit. In an embodiment, when the host has completed its preparation for transmission of the image data and the second interrupt signal is at the active level, and the host may start to transmit the image data. When the host has completed its preparation for transmission of the image data but the second interrupt signal is at the inactive level, the host may not transmit the image data. The host may transmit the image data when the level of the second interrupt signal changes to the active level.

In an embodiment, the host may complete its preparation for transmission of the image data, and start to transmit the image data in synchronization with a rising edge of the second interrupt signal. The host may not transmit the image data when the second interrupt signal does not have a rising edge.

In operation S1240, the display driving circuit may control the level of the second interrupt signal based on whether the image data has started to be received from the host. In an embodiment, based on a time point at which the level of the second interrupt signal changes, the display driving circuit may determine whether the image data has started to be received. When the image data is received within a preset time period from a time point at which the level of the second interrupt signal changes from the inactive level to the active level, the display driving circuit may determine that the image data is received.

When it is determined that the image data has started to be received, the display driving circuit may control the second interrupt signal to be at the inactive level. The display driving circuit may control the second interrupt signal to be at the inactive level immediately when the image data has started to be received, or may control the second interrupt signal to be at the inactive level after a preset time period after the image data has started to be received. The display driving circuit may maintain the second interrupt signal of the inactive level until an interrupt signal is generated to request transmission of image data for the next frame.

When it is determined that the image data has not started to be received, the display driving circuit may control the level of the second interrupt signal based on the data provision time period. When the display driving circuit has not started to receive the image data, the display driving circuit may continue to control the second interrupt signal based on the data provision time period. In other words, when the display driving circuit has not started to receive the image data, the display driving circuit may perform operation S1230 again. By controlling the level of the second interrupt signal based on the data provision time period until the image data starts to be received, and causing the image data to be received in the data provision time period, flicker and an issue on image quality may be alleviated.

Figure 13:
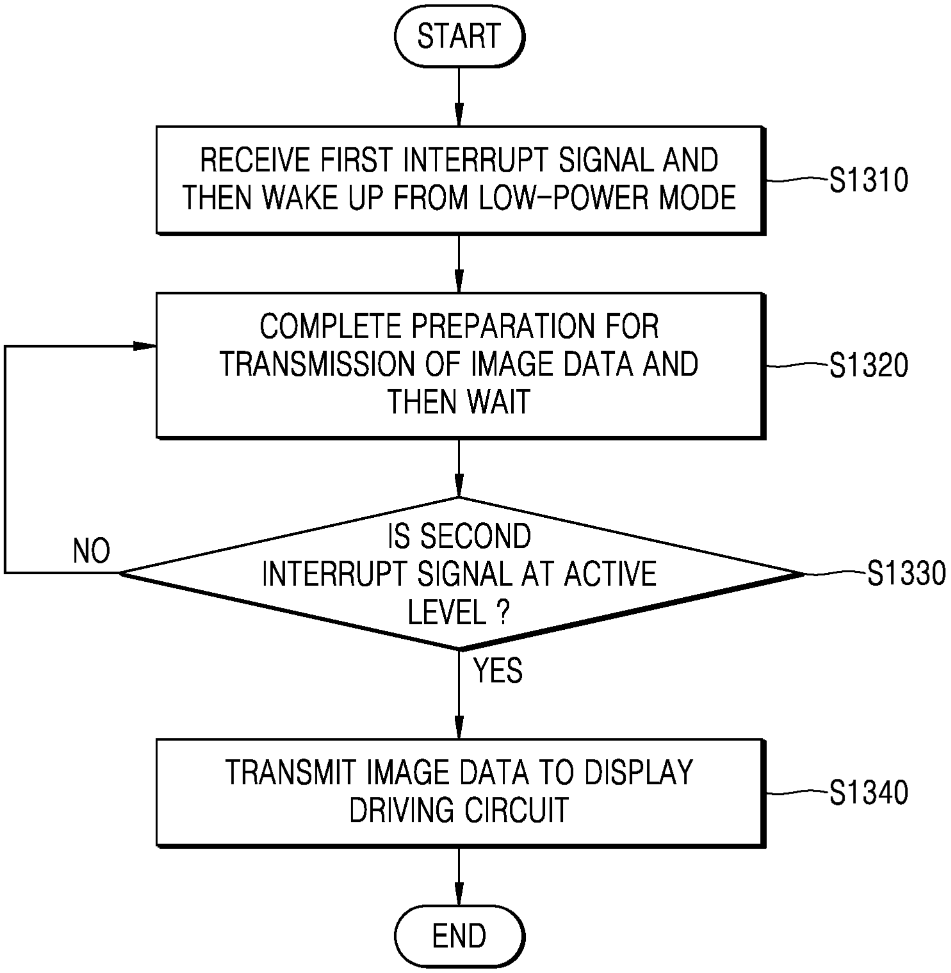
FIG. 13 is a flowchart illustrating an operation method of a host according to an embodiment of the inventive concept.

FIG. 13 is a flowchart illustrating an operation method of a host according to an embodiment of the inventive concept. For example, FIG. 13 illustrates an operation method of the host 200 of FIG. 1.

In operation S1310, the host may receive a first interrupt signal and then wake up from a low-power mode. The host may be in the low-power mode and at least some of the components of the host for driving a display panel may be driven with low power or may be powered off. In the low-power mode, communication between the host and a display driving circuit may not be seamless.

The host may wake up and then perform operation S1320. In operation S1320, the host may prepare to transmit image data and then wait. The host may prepare to transmit the image data in response to the first interrupt signal of the active level. When the preparation is completed, the host may wait to transmit the image data.

In operation S1330, the host may determine, based on a second interrupt signal, whether to transmit the image data to the display driving circuit. The host may receive the second interrupt signal from the display driving circuit. When the host completes its preparation for transmission of the image data, the host may transmit the image data to the display driving circuit based on the second interrupt signal. Based on at least one of the level of the second interrupt signal and a change in the level of the second interrupt signal, the host may determine whether to transmit the image data to the display driving circuit.

In an embodiment, when the host has completed its preparation for transmission of the image data and determines that the second interrupt signal is at the active level, the host may transmit the image data to the display driving circuit (operation S1340). When the host has completed its preparation for transmission of the image data but determines that the second, interrupt signal is at the inactive level, the host may not transmit the image data. In other words, when the host determines that the second interrupt signal is at the inactive level, the host may perform operation S1320 again. The host may transmit the image data when the level of the second interrupt signal changes to the active level.

In an embodiment, the host may complete the preparation for transmission of the image data, and start to transmit the image data in synchronization with a rising edge of the second interrupt signal. The host may not transmit the image data when the second interrupt signal does not have a rising edge.

The host according to an embodiment of the inventive concept may transmit image data to a display driving circuit based on an interrupt signal of an active level. Even when the display driving circuit and the host are asynchronous with each other, the host transmits the image data based on the interrupt signal, and thus the display driving circuit and the host may recognize each other.

While the inventive concept has been particularly shown and described with reference to embodiments thereof, it will be understood that various changes in form and details may be made thereto without departing from the spirit and scope of the inventive concept as set forth in the following claims.

What is claimed is:

1. A display driving circuit for receiving image data from a host and driving a display panel, the display driving circuit comprising:
- an interface configured to receive the image data from the host; and
- a timing controller configured to control a first interrupt signal for waking up the host in a low-power mode and to control a second interrupt signal based on a light emission control signal, wherein the light emission control signal is for controlling a light emission time of a pixel included in the display panel, and
- wherein the timing controller is further configured to control a level of the second interrupt signal based on whether the image data has started to be received from the host in response to the first interrupt signal and the second interrupt signal,
- wherein some components of the host for driving the display panel are driven with low power or powered off in the low-power mode.

2. The display driving circuit of claim 1, wherein the timing controller is further configured to control, based on a time point at which a level of the light emission control signal changes, the second interrupt signal to be at an active level.

3. The display driving circuit of claim 2, wherein the timing controller is further configured to determine whether the image data has started to be received from the host when the second interrupt signal is at the active level.

4. The display driving circuit of claim 2, wherein the timing controller is further configured to control the second interrupt signal to be at an inactive level, when it is determined, based on a time point at which the level of the second interrupt signal changes, that the image data has started to be received from the host in response to the second interrupt signal at the active level.

5. The display driving circuit of claim 2, wherein the timing controller is further configured to control the level of the second interrupt signal based on the light emission control signal, when it is determined, based on a time point at which the level of the second interrupt signal changes, that the image data has not started to be received from the host in response to the second interrupt signal at the active level.

6. The display driving circuit of claim 1, wherein the display panel is a low-temperature polycrystalline oxide (LTPO) display panel.

7. The display driving circuit of claim 1, wherein the timing controller is further configured to generate, based on a preset reference time period, the first interrupt signal.

8. The display driving circuit of claim 1, wherein the timing controller is further configured to maintain the first interrupt signal at the active level during a preparation period, and then control the level of the second interrupt signal based on the light emission control signal.

9. A display driving circuit for operating in a video mode, the display driving circuit comprising:

an interface configured to receive image data from a host; and a timing controller configured to determine a time period during which an image signal corresponding to the image data received from the interface in the video mode is to be provided to a display panel, wherein the timing controller is further configured to generate a first interrupt signal for waking up the host in a low-power mode, control a second interrupt signal based on the time period during which the image signal is to be provided to the display panel, and control a level of the second interrupt signal based on whether the image data has started to be received from the host in response to the first interrupt signal and the second interrupt signal through the interface, wherein some components of the host for driving the display panel are driven with low power or powered off in the low-power mode.

10. The display driving circuit of claim 9, wherein the timing controller is further configured to control, based on the time period during which the image signal is to be provided to the display panel, the level of the second interrupt signal to be an active level.

11. The display driving circuit of claim 10, wherein the timing controller is further configured to control the second interrupt signal to be at an inactive level, when it is determined, based on a time point at which the level of the second interrupt signal changes from the inactive level to the active level, that the image data has started to be received from the host that has received the second interrupt signal at the active level.

12. The display driving circuit of claim 10, wherein the timing controller is further configured to control the level of the second interrupt signal based on the time period during which the image signal is to be provided to the display panel, when it is determined, based on a time point at which the level of the second interrupt signal changes from an inactive level to the active level, that the image data has not started to be received from the host that has received the second interrupt signal at the active level.

13. The display driving circuit of claim 9, wherein the timing controller is further configured to determine the time period based on a light emission control signal for controlling a light emission time of a pixel included in the display panel.

14. The display driving circuit of claim 13, wherein the timing controller is further configured to determine the time period during which the image signal is to be provided to the display panel based on a time point at which a level of the light emission control signal changes.

15. An operation method of a display driving circuit for receiving image data from a host and driving a display panel, the operation method comprising:

generating a first interrupt signal for waking up the host in a low-power mode;

determining a time period during which the display driving circuit is to provide the display panel with an image signal corresponding to the image data;

controlling, based on the time period during which the image signal is to be provided to the display panel, a level of a second interrupt signal; and controlling the level of the second interrupt signal, based on whether the image data has started to be received from the host that has woken up in response to the first interrupt signal and then responded to the second interrupt signal, wherein some components of the host for driving the display panel are driven with low power or powered off in the low-power mode.

16. The operation method of claim 15, wherein the controlling of the level of the second interrupt signal based on the tune period comprises controlling, based on the time period during which the image signal is to be provided to the display panel, the second interrupt signal to be at an active level.

17. The operation method of claim 15, wherein the controlling of the level of the second interrupt signal based on whether the image data has started to be received comprises controlling the second interrupt signal to be at an inactive level, when the image data has started to be received from the host based on a time point at which the level of the second interrupt signal changes from the inactive level to an active level.

18. The operation method of claim 15, wherein the controlling of the level of the second interrupt signal based on whether the image data has started to be received comprises returning back to the controlling of the level of the second interrupt signal based on the time period during which the image signal is to be provided to the display panel, when the image data has not started to be received from the host based on a time point at which the level of the second interrupt signal changes from an inactive level to an active level.

19. The operation method of claim 15, wherein the determining of the time period comprises determining the time period during which the image signal is to be provided to the display panel based on a light emission control signal for controlling a light emission time of a pixel included in the display panel.

* * * * *